(12) United States Patent
Poon et al.

(10) Patent No.: US 8,582,623 B2
(45) Date of Patent: *Nov. 12, 2013

(54) MULTIPLEXED CDMA AND GPS SEARCHING

(75) Inventors: Wang Paul Poon, San Diego, CA (US); Qiuzhen Zou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

This patent is subject to a terminal disclaimer.

(21) Appl. No.: 12/776,071

(22) Filed: May 7, 2010

(65) Prior Publication Data
US 2010/0222076 A1    Sep. 2, 2010

Related U.S. Application Data

(63) Continuation of application No. 10/041,205, filed on Jan. 7, 2002, now Pat. No. 7,738,533.

(51) Int. Cl.
*H04B 1/707* (2011.01)

(52) U.S. Cl.
USPC .......................................................... 375/148

(58) Field of Classification Search
USPC .......... 375/147, 148, 130, 152, 131, 140, 136
See application file for complete search history.

(56) References Cited

U.S. PATENT DOCUMENTS

| | | | |
|---|---|---|---|
| 5,901,171 A | 5/1999 | Kohli et al. | |
| 6,081,229 A | 6/2000 | Soliman et al. | |
| 6,188,354 B1 | 2/2001 | Soliman et al. | |
| 6,249,539 B1 | 6/2001 | Harms et al. | |
| 6,259,724 B1 | 7/2001 | Esmailzadeh | |
| 6,321,090 B1 | 11/2001 | Soliman | |
| 6,480,529 B1 | 11/2002 | Sih et al. | |
| 6,731,622 B1 | 5/2004 | Frank et al. | |
| 6,738,411 B1 | 5/2004 | Ogawa et al. | |
| 7,738,533 B2 * | 6/2010 | Poon et al. | 375/148 |
| 2002/0064208 A1 | 5/2002 | Saito | |
| 2003/0112776 A1 | 6/2003 | Brown et al. | |

FOREIGN PATENT DOCUMENTS

| | | |
|---|---|---|
| JP | 2001223613 | 8/2001 |
| RU | 95109373 | 6/1991 |
| RU | 2084916 C1 | 7/1997 |
| WO | WO9714056 | 4/1997 |

(Continued)

OTHER PUBLICATIONS

3GPP2 C.S0002-A-1 v2, Physical Layer Standard for cdma2000 Spread Spectrum Systems, Release A, Addendum 1 (Oct. 2000).

(Continued)

*Primary Examiner* — Kevin M Burd

(57) ABSTRACT

Searcher hardware is multiplexed to perform simultaneous searches in either an IS-95 CDMA mode or a GPS mode. In the IS-95 mode, the search hardware is time-multiplexed into a number of searcher time slices, each of which can generate a PN sequence to despread a data sequence. In the GPS mode, the search hardware is configured as a number of distinct GPS channels, each of which can generate a Gold code sequence for tracking a GPS signal from a particular GPS satellite. This configuration allows the searcher to perform multiple GPS signal searches simultaneously. Signal searching in both IS-95 and GPS modes is performed at significantly higher speeds compared to conventional searcher hardware. Moreover, the search hardware can be dynamically configured to operate in either the IS-95 or the GPS mode, eliminating the need for dedicated circuitry for each mode of operation.

24 Claims, 21 Drawing Sheets

(56) References Cited

FOREIGN PATENT DOCUMENTS

WO  WO9952077 A1  10/1999
WO  WO0059123     10/2000
WO  WO0147135     6/2001

OTHER PUBLICATIONS

3GPP2 C.S0005-A, Oct. 17, 2000.
Co-pending U.S. Appl. No. US20010885755, filed on Jun. 19, 2001.
ETSI TS 125 211 v4.1.0; "Universal Mobile Telecommunications System (UMTS); Physical channels and mapping of transport channels onto physical channels (FDD)"; 3GPP TS 25.211 version 4.1.0 Release 4 (Jun. 2001).
ETSI TS 125 212 v4.1.0; "Universal Mobile Telecommunications System (UMTS); Multiplexing and channel coding (FDD)", 3G TS 25.212 version 4.1.0 Release 4 (Jun. 2001).
ETSI TS 125 213 v4.1.0; Universal Mobile Telecommunications System (UMTS); Spreading and modulation (FDD), 3G TS 25 213 version 4.1.0 Release 4 (Jun. 2001).
ETSI TS 125 214 v4.1.0; "Universal Mobile Telecommunications System (UMTS); Physical layer procedures (FDD)", 3G TS 25.214 version 4.1.0 Release 4 (Jun. 2001).
International Search Report—PCT/US03/000134, International Search Authority—European Patent Office—Apr. 24, 2003.
TIA/EIA-95-B "Mobile Station-Base Station Compatibility Standard for Wideband Spread Spectrum Cellular Systems", Mar. 1999, XP-002145331.
Wideband Spread Spectrum Cellular Systems, Mar. 1999, XP-002145331.
European Search Report—EP10162452—Search Authority—Hague—Feb. 15, 2012.

* cited by examiner

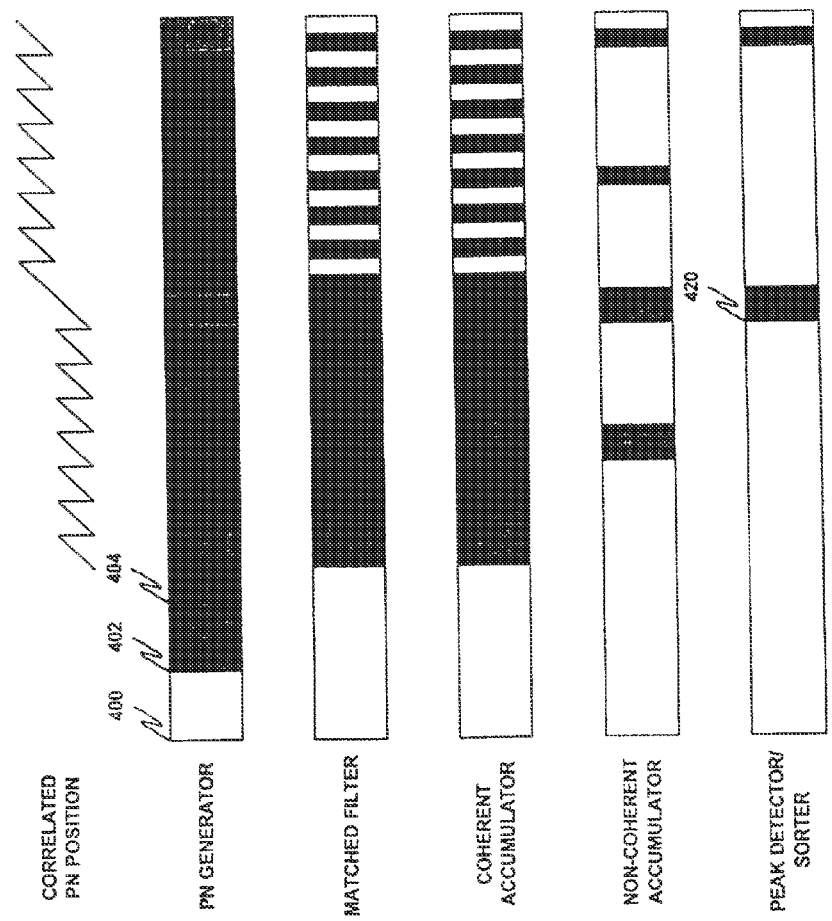

MULTIPLEXED CDMA AND GPS SEARCHING

CLAIM OF PRIORITY UNDER 35 U.S.C. §120

The present application for patent is a Continuation and claims priority to patent application Ser. No. 10/041,205 entitled "MULTIPLEXED CDMA AND GPS SEARCHING" filed Jan. 7, 2002, now allowed, and assigned to the assignee hereof and hereby expressly incorporated by reference herein.

FIELD

The invention relates to wireless communications and, more particularly, to signal searching in wireless communication devices.

BACKGROUND

Wireless communication systems are widely deployed to provide various types of communication, such as voice and data communications. These systems may be based on a variety of modulation techniques, such as code division multiple access (CDMA) or time division multiple access (TDMA). A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Pseudorandom noise (PN) sequences are commonly used in CDMA systems for spreading transmitted data, including transmitted pilot signals. The time required to transmit a single value of the PN sequence is known as a chip time, and the rate at which the chips vary is known as the chip rate. CDMA receivers commonly employ rake receivers. A rake receiver is typically made up of one or more searchers for locating direct and multipath pilots from one or more base stations, and two or more multipath demodulators (fingers) for receiving and combining information signals from those base stations.

Inherent in the design of direct sequence CDMA systems is the requirement that a receiver must align its PN sequences to those of a base station. For example, in IS-95, each base station and subscriber unit uses the exact same PN sequences. A base station distinguishes itself from other base stations by inserting a unique time offset in the generation of its PN sequences (all base stations are offset by an integer multiple of 64 chips). A subscriber unit communicates with a base station by assigning at least one finger to that base station. An assigned finger must insert the appropriate offset into its PN sequence in order to communicate with that base station. An IS-95 receiver uses one or more searchers to locate the offsets of pilot signals, and hence to use those offsets in assigning fingers for receiving. Since IS-95 systems use a single set of in-phase (I) and quadrature (Q) PN sequences, one method of pilot location is to simply search the entire PN space by correlating an internally generated PN sequence with different offset hypotheses until one or more pilot signals are located.

As the searcher correlates the PN sequence with each offset hypothesis, it records the resulting signal energy. Energy peaks appear for the offset hypotheses that result in recovery of the signal, while other offset hypotheses typically result in little or no signal energy. Multiple energy peaks may result from, for example, echoes produced when signals reflect from buildings and other objects.

PN sequences are also used in global positioning system (GPS) receivers for position location. GPS satellites transmit PN sequences to a GPS receiver, which uses the PN sequences to calculate the distance between the GPS receiver and the satellites. By calculating the distance from a number of satellites, the GPS receiver can use trilateration techniques to determine the location of the GPS receiver.

The PN sequences used in GPS receivers are known as Gold codes and have particularly good autocorrelation and cross-correlation properties. The cross-correlation properties of the Gold codes are such that the correlation function between two different sequences is low, enabling GPS receivers to distinguish between signals transmitted from different satellites. A GPS receiver typically employs a searcher that can generate the Gold code that is needed to track and lock onto the GPS signal from a particular GPS satellite.

Search time is an important metric in determining the quality of a CDMA or GPS system. Decreased search time implies that searches can be done more frequently. As such, a subscriber unit can locate and access the best available cell more often, resulting in better signal transmission and reception, often at reduced transmission power levels by both the base station and the subscriber unit. This, in turn, increases the capacity of the CDMA system, either in terms of support for an increased number of users, higher transmission rates, or both. Decreased search time is also advantageous when a subscriber unit is in idle mode. In idle mode, a subscriber unit is not actively transmitting or receiving voice or data, but is periodically monitoring the system. In idle mode, the subscriber unit can remain in a low power state when it is not monitoring. Reduced search time allows the subscriber unit to spend less time monitoring, and more time in the low power state, thus reducing power consumption and increasing standby time.

SUMMARY

In general, the invention facilitates high-speed signal searching by multiplexing searcher hardware to perform simultaneous searches. Various embodiments provide a searcher that can operate in at least two selectable modes. In an IS-95 mode, the searcher is time-multiplexed into a number of searcher time slices, each of which can generate a PN sequence to despread the same data sequence. In a GPS mode, the searcher is configured as a number of distinct GPS channels, each of which can generate a unique Gold code sequence for tracking a GPS signal from a particular GPS satellite. This configuration allows the searcher to perform multiple GPS signal searches simultaneously.

The invention may offer a number of advantages. Signal searching in both IS-95 and GPS modes can be performed at significantly higher speeds compared to conventional searcher hardware. For example, in the IS-95 mode, search speed may be increased by more than an order of magnitude.

Search speed may also be significantly increased in the GPS mode. Moreover, the search hardware can be dynamically configured to operate in either the IS-95 or the GPS mode, eliminating the need for dedicated circuitry for each mode of operation.

In one embodiment, the invention is directed to a channel search method implemented in a spread spectrum system. Multiple independent searches are simultaneously executed. A demodulator of a wireless communication device is configured as a function of results from the independent searches.

The channel search hardware may be configured to operate in either a GPS mode or an IS-95 mode. In the GPS mode, a coherent accumulation result is generated as a function of the despread data. The demodulator is configured as a function of the coherent accumulation result. In the IS-95 mode, energy values are computed as a function of the coherent accumulation results. These energy values are used in generating noncoherent accumulation results, which are in turn used in identifying energy peaks. The energy peaks are sorted, and the demodulator is configured as a function of the sorted energy peaks.

Other embodiments are directed to processor-readable media and apparatuses. For instance, an example apparatus embodying the invention includes a channel search module configured to perform simultaneously executed independent searches in a GPS mode or an IS-95 mode. A modem demodulates a signal based on results from the searches.

Additional details of various embodiments are set forth in the accompanying drawings and the description below. Other features, objects and advantages will become apparent from the description and drawings, and from the claims.

BRIEF DESCRIPTION OF THE DRAWINGS

FIG. 21 is a timing diagram illustrating still another example timing sequence controlled by the configuration module.

DETAILED DESCRIPTION

Figure 1:
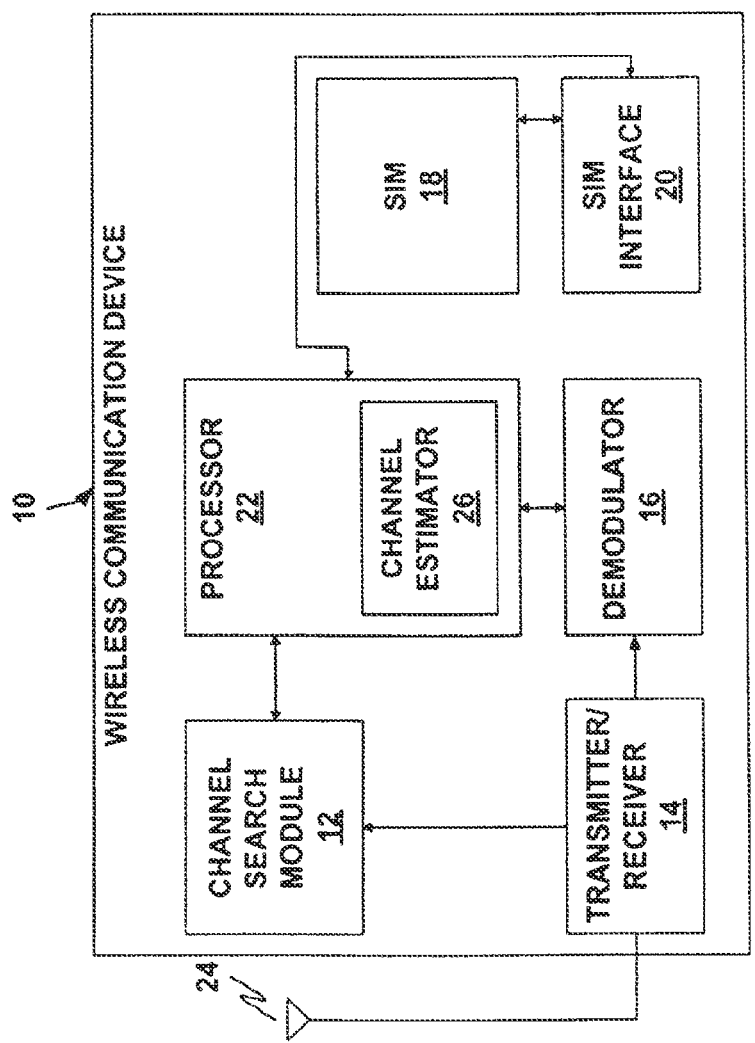
FIG. 1 is a block diagram illustrating a wireless communication device (WCD) that incorporates a channel search module, according to one implementation of the invention.

FIG. 1 is a block diagram illustrating an example wireless communication device (WCD) 10 having a channel search module 12 that facilitates high-speed searching of CDMA pilot channels and GPS channels. Channel search module 12 is multiplexed to perform simultaneous searches in one of a number of dynamically selectable modes, including, for example, an IS-95 CDMA mode and a GPS mode. In the IS-95 mode, channel search module 12 is time-multiplexed into a number of searcher time slices, each of which can generate a PN sequence to despread a data sequence. In the GPS mode, channel search module 12 is configured as a number of distinct GPS channels, each of which can generate a Gold code sequence for tracking a GPS signal from a particular GPS satellite. This configuration allows channel search module 12 to perform multiple GPS signal searches simultaneously. As a result, signal searching in both IS-95 and GPS modes is performed at significantly higher speeds compared to conventional searcher hardware. Moreover, the search hardware can be dynamically configured to operate in either the IS-95 or the GPS mode, eliminating the need for dedicated circuitry for each mode of operation.

As shown in FIG. 1, WCD 10 may include, in addition to channel search module 12, a radio frequency transmitter/receiver 14, a modem 16, a subscriber identity module (SIM) 18, a SIM interface 20, a microprocessor 22, and a radio frequency antenna 24. Non-limiting examples of WCD 10 include a cellular radiotelephone, satellite radiotelephone, a PCMCIA card incorporated within a computer, a PDA equipped with wireless communication capabilities, and the like.

WCD 10 may be designed to support one or more CDMA standards and/or designs (e.g., the W-CDMA standard, the IS-95 standard, the cdma2000 standard, and the HDR specification). Modem 16 includes demodulator/decoder circuitry and encoder/modulator circuitry, both of which are coupled to transmitter/receiver 14 to transmit and receive the communication signals. SIM interface 20 includes circuitry that drives communication between modem 16 and SIM 18.

In an embodiment of the invention, WCD 10 uses a CDMA protocol to transmit and receive signals with a base station via antenna 24. Before communicating signals with the base station, WCD 10 must align its PN sequences to those of the base station. For example, in IS-95, each base station and subscriber unit uses the exact same PN sequences. Base stations are distinguished by unique time offsets in the generation of their PN sequences. WCD 10 communicates with a base station by assigning at least one finger to that base station. An assigned finger must insert the appropriate offset into its PN sequence in order to communicate with that base station. An IS-95 receiver uses channel search module 12 to locate the offsets of pilot signals, and hence to use those offsets in assigning fingers for receiving signals from the base station. Since IS-95 systems use a single set of in-phase (I) and quadrature (Q) PN sequences, one method of pilot location is to simply search the entire PN space by using a correlator module 26 or, alternatively, modem 16, to correlate an internally generated PN sequence with different offset hypotheses until one or more pilot signals are located.

WCD 10 can also operate in a GPS mode in which WCD 10 receives GPS signals and calculates the position of WCD 10 based on the received GPS signals. Before using GPS signals for position calculation, search module 12 must track and lock onto GPS satellites. Since GPS systems use a set of in-phase (I) and quadrature (Q) PN sequences known as Gold codes, one method of GPS signal searching is to simply search the entire PN space by using a correlator module 26 or, alternatively, modem 16, to correlate an internally generated PN sequence with different offset hypotheses until one or more GPS signals are located.

As correlator module 26 correlates the PN sequence with each offset hypothesis, channel search module 12 records the resulting signal energy. Energy peaks appear for the offset hypotheses that result in recovery of the signal, while other offset hypotheses typically result in little or no signal energy. The signal energy level may be expressed as a relative value, e.g., a scaled integer having a value between 0 and 65535. As described below, channel search module 12 maps the offsets to corresponding signal energy levels, and identifies one or more signal peaks having the greatest energy levels. While only one offset is used in the generation of a PN sequence for a particular base station, signal reflections or echoes may cause multiple energy peaks to occur. WCD 10 may use these echoes to facilitate recovery of the transmitted signal.

The operation of channel search module 12 is controlled by channel search software executed, for example, by microprocessor 22. The channel search software defines a search window by specifying the offset at which channel search module 12 begins the search, as well as either an offset at which channel search module 12 ends the search or the size of the search window, i.e., the number of offsets to search. Channel search module 12 then applies the offsets in the search window to the CDMA signal as described above and reports the results to the channel search software. The channel search software then uses this information to configure modem 16 by, for example, assigning demodulation fingers corresponding to the located spreading codes. The channel search software may also use the search results for other purposes, such as determining the physical location of WCD 10. Both assignment of demodulation fingers and position determination are improved by more accurate offset determination. For example, an accurate offset determination reduces the time needed for time-tracking. In addition, the location of WCD 10 can be determined more accurately. In W-CDMA devices, the offset determination may be used in an observed time difference of arrival (OTDOA) calculation to determine the position of WCD 10.

The channel search software can dynamically configure channel search module 12 to operate in an IS-95 mode or a GPS mode. In the IS-95 mode, the main tasks of channel search module 12 are to compute correlated energies between the incoming baseband I-Q samples and locally generated PN sequences for a range of PN timing offsets, and to report the highest correlated energies, i.e., the peak energies and the corresponding PN offsets.

The correlation operation involves despreading incoming samples using a locally generated PN sequence, followed by summing or accumulating successive despread samples. Because both the incoming samples and the locally generated PN sequence consist of I and Q components, the despreading operation involves complex multiplication:

$$(S_I + jS_Q)(PN_I - jPN_Q),$$

where S and PN refer to the input samples and locally generated PN sequences, respectively, with the subscripts designating the I and Q quadrature components. The despread samples are first coherently accumulated and subsequently further non-coherently accumulated. Coherent accumulation refers to the accumulation of I and Q components individually. Non-coherent accumulation, on the other hand, refers to the accumulation of energies, i.e., $I^2 + Q^2$, rather than individual I and Q components. Coherent accumulation yields a better signal-to-noise ratio (SNR) than non-coherent accumulation for the same accumulation length, but is more susceptible to frequency error. The coherent and non-coherent accumulation lengths are supplied to the channel search module 12 by microprocessor 22 as parameters. In addition to collecting correlated energy values for the range of PN offsets specified externally by microprocessor 22, channel search module 12 sorts these energy values and reports only a specified number of peaks within the search window.

In the GPS mode, channel search module 12 still performs matched filtering of incoming samples, despreading using locally generated PN sequences, and coherent accumulation, as in the IS-95 mode. Non-coherent accumulation, however, is not performed. Instead, the coherent accumulation results are sent to microprocessor 22 through a direct memory access (DMA) interface. Because non-coherent accumulation is not performed, backend processes such as non-coherent accumulation, peak detection, and sorting are disabled in the GPS mode to conserve power.

In the IS-95 mode, channel search module 12 can perform four independent searches simultaneously. Each independent search can work with a different set of parameters including window size, coherent and non-coherent accumulation lengths, and PN offset. For example, the search window size can range from 1 chip to 128K chips. The coherent and non-coherent accumulation lengths may range from 8 to 8K chips and from 1 to 64 chips, respectively. Each independent search is called a slice, as it is performed by time-multiplexed searcher hardware rather than dedicated hardware. That is, the same searcher hardware is used to perform all of the searches in a time-multiplexed manner.

In the GPS mode, channel search module 12 can simultaneously search eight satellite paths in a C×2 mode, a C×4 mode, or a C×8 mode. Searching the satellite paths in the C×8 mode yields more precise position location than searching in the C×2 mode or the C×4 mode, but with a narrower range. For this reason, the C×8 mode is sometimes referred to as a fine search. The C×4 and C×2 modes are respectively referred to as medium and coarse searches. Each path can have an independent PN offset, but all searches are performed in the same mode. In the GPS mode, each GPS channel continues performing coherent correlation on different PN offsets until the GPS channel is stopped by microprocessor 22. As correlation is completed, results of the correlation are transferred to a memory associated with microprocessor 22 via a DMA interface before the results are overwritten by new correlation results. The coherent integration length may range from 1024 chips to 8K chips.

Figure 2:
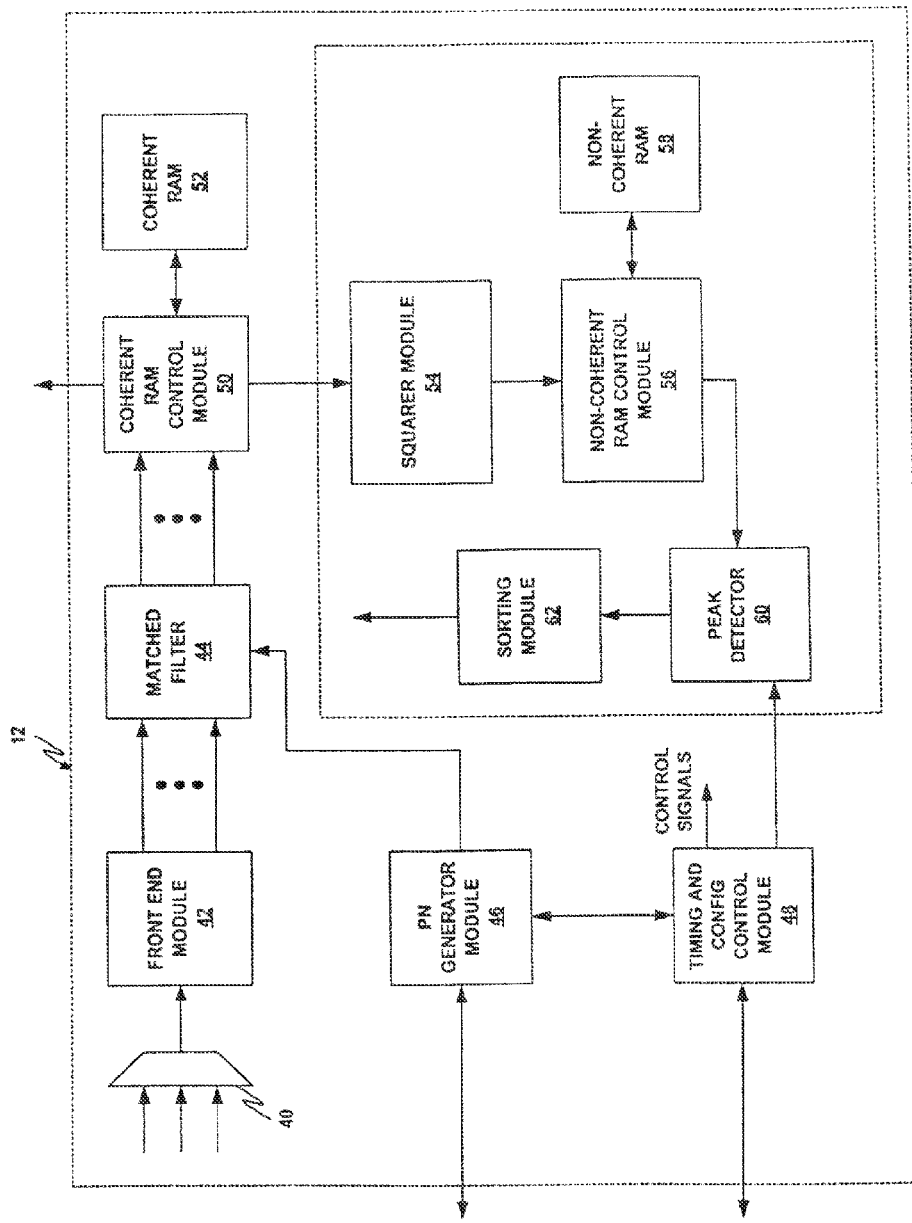
FIG. 2 is a block diagram illustrating an example channel search module, according to another implementation of the invention.
Figure 17:
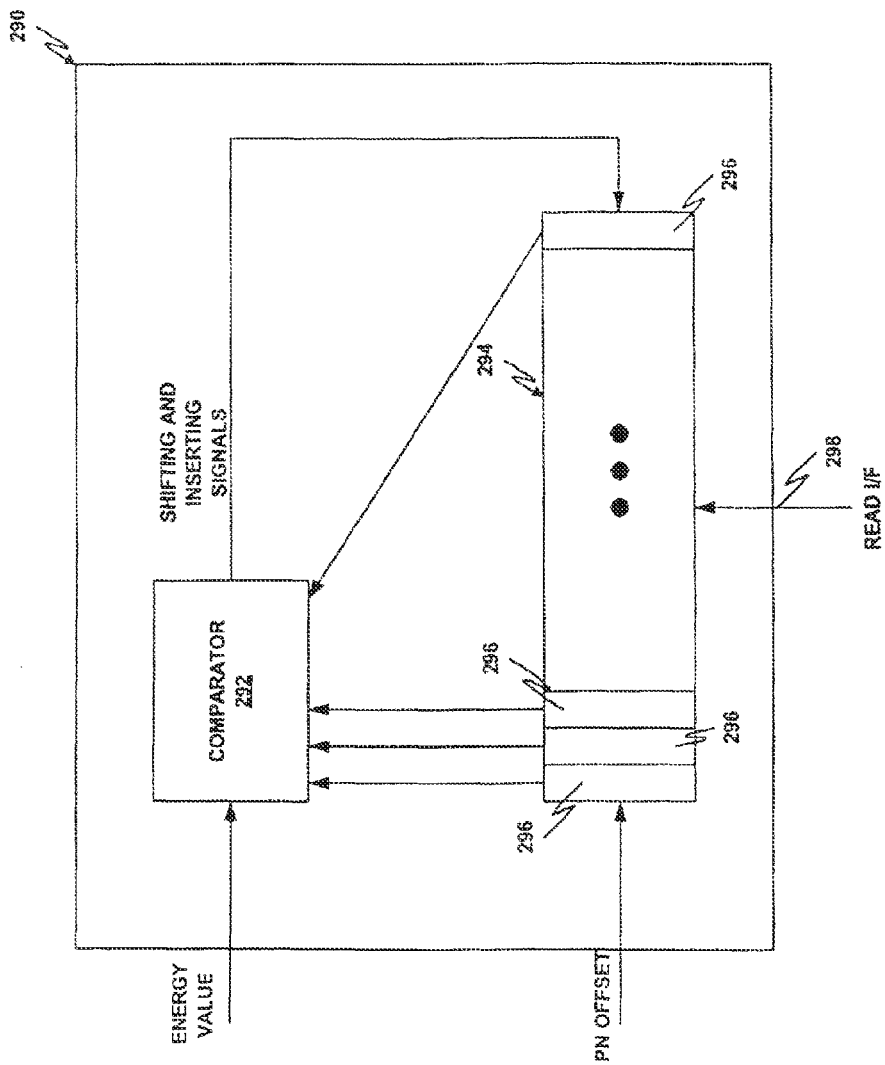
FIG. 17 is a block diagram illustrating an example searcher sorting queue for use in the channel search module.
Figure 18:
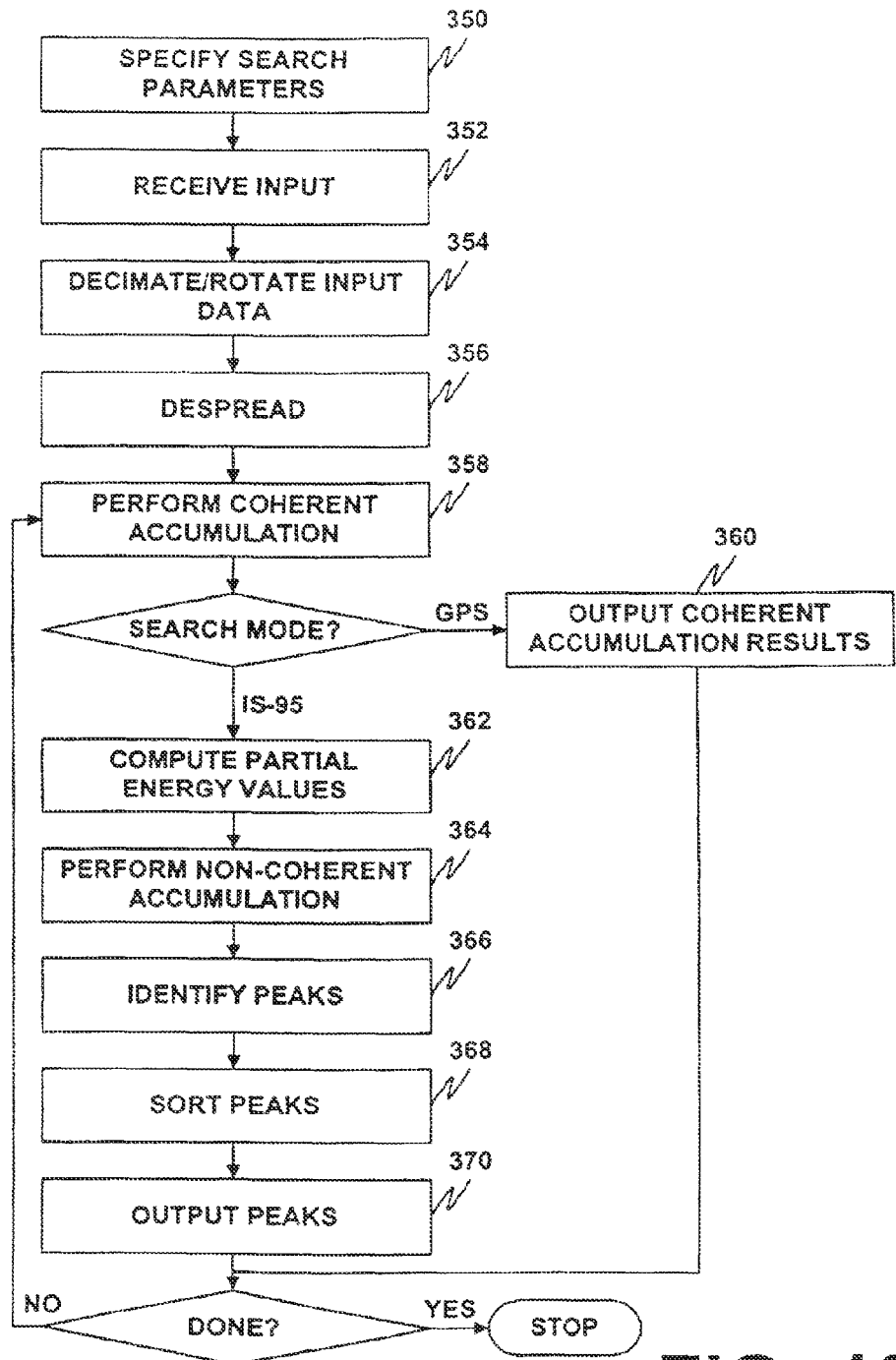
FIG. 18 is a flow diagram illustrating an example mode of operation of the channel search module.
Figure 19:
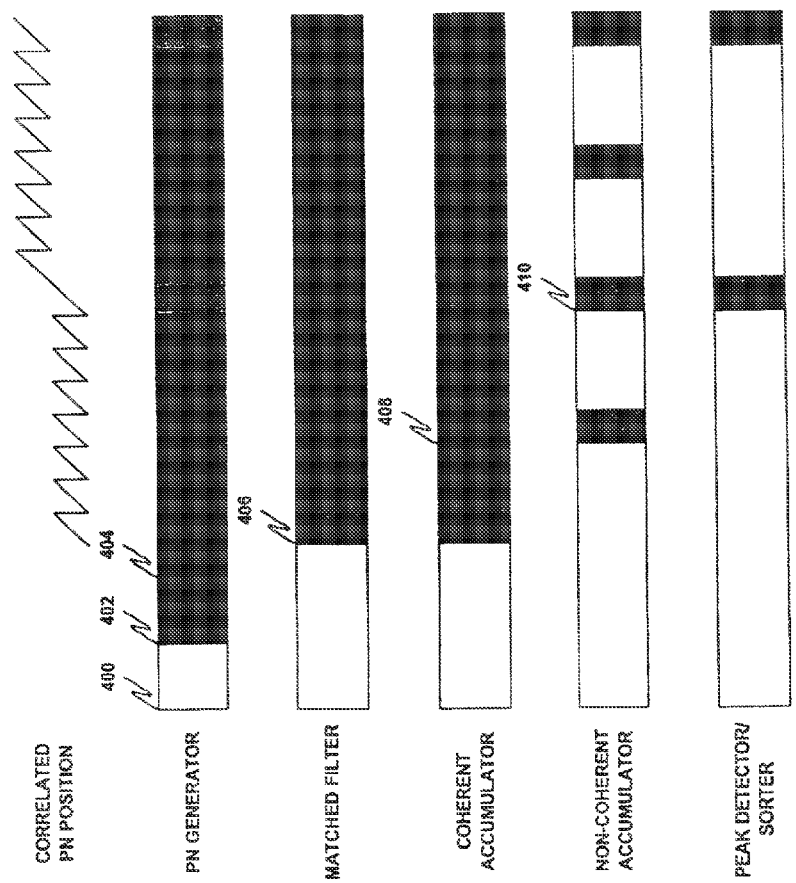
FIG. 19 is a timing diagram illustrating an example timing sequence controlled by the configuration module.
Figure 20:
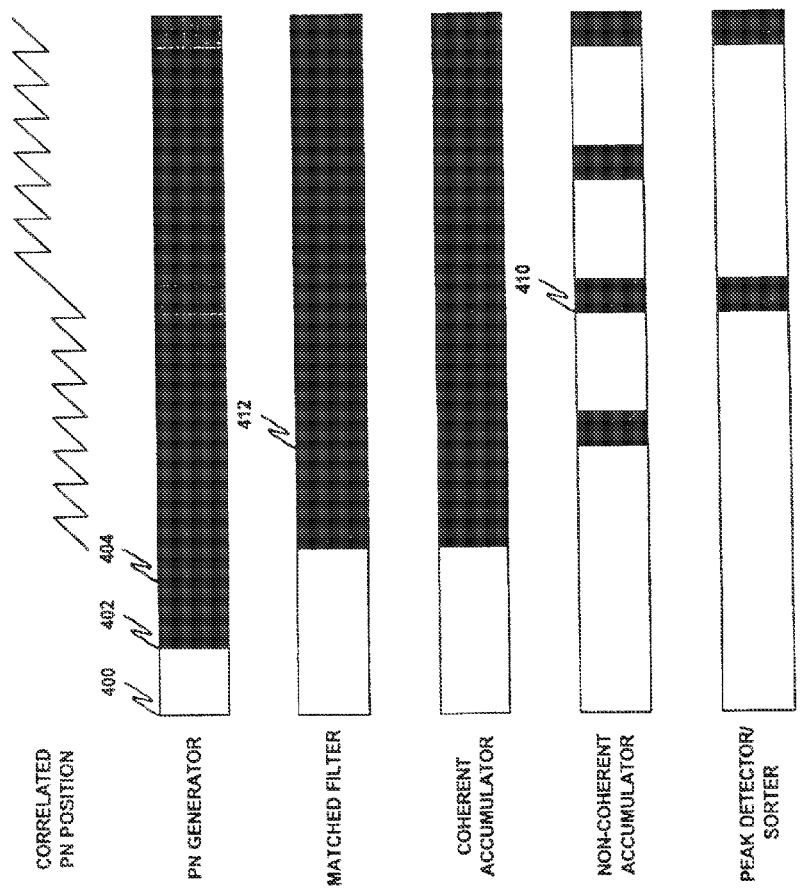
FIG. 20 is a timing diagram illustrating another example timing sequence controlled by the configuration module.

FIG. 2 is a block diagram illustrating an example implementation of channel; search module 12, according to an embodiment of the invention. FIGS. 3-17 illustrate various components of channel search module 12. FIG. 18 is a flow diagram depicting an example mode of operation of channel search module 12. FIGS. 19-21 are timing diagrams illustrating certain timing relationships within the mode of operation illustrated in FIG. 18.

A search session is initiated when microprocessor 22 specifies a set of search parameters via control registers (350). Channel search module 12 then receives I/Q data samples (352) at an input 40. A front-end module 42 decimates and rotates the I/Q data samples to remove any large frequency offsets (354). Next, a matched filter 44 despreads the rotated data (356) using PN sequences generated by a PN generator module 46. Generation of the PN sequences, as well as other operations of channel search module 12, is controlled by a timing and configuration control module 48.

A coherent accumulator, including a coherent RAM control module 50 and a coherent RAM 52, performs coherent accumulation on the rotated data to obtain I and Q sums (356). In the GPS search mode, the coherent accumulation results are provided to microprocessor 22 and may be used to configure demodulator 16.

In the IS-95 mode, on the other hand, a squarer module 54 computes partial energy values based on the coherent accumulation results (362). These partial energy values are non-coherently accumulated (364) by a non-coherent accumulator, which includes a non-coherent RAM control module 56 and a non-coherent RAM 58. A peak detector 60 then analyzes the non-coherent accumulation results to identify a set of energy peaks (366), which are sorted (368) by a sorting module 62. Sorting module 62 outputs the sorted energy peaks (370) to microprocessor 22, which may use the sorted energy peaks to configure demodulator 16.

As described above, a search session is initiated when microprocessor 22 specifies a set of search parameters via control registers (350). These search parameters include, for example, the searcher mode (IS-95 or GPS), the searcher slice number, the window size, the coherent and non-coherent accumulation lengths, PN polynomials, a Walsh number, a PN state, a corresponding PN count, a target PN position, a frequency offset, an energy threshold, and one or more peak detector modes. The roles of these search parameters are described below in connection with FIGS. 2-17. For example, the PN count value, the PN state, and the PN polynomials are used to configure a PN generator for the specified searcher slice.

Figure 3:
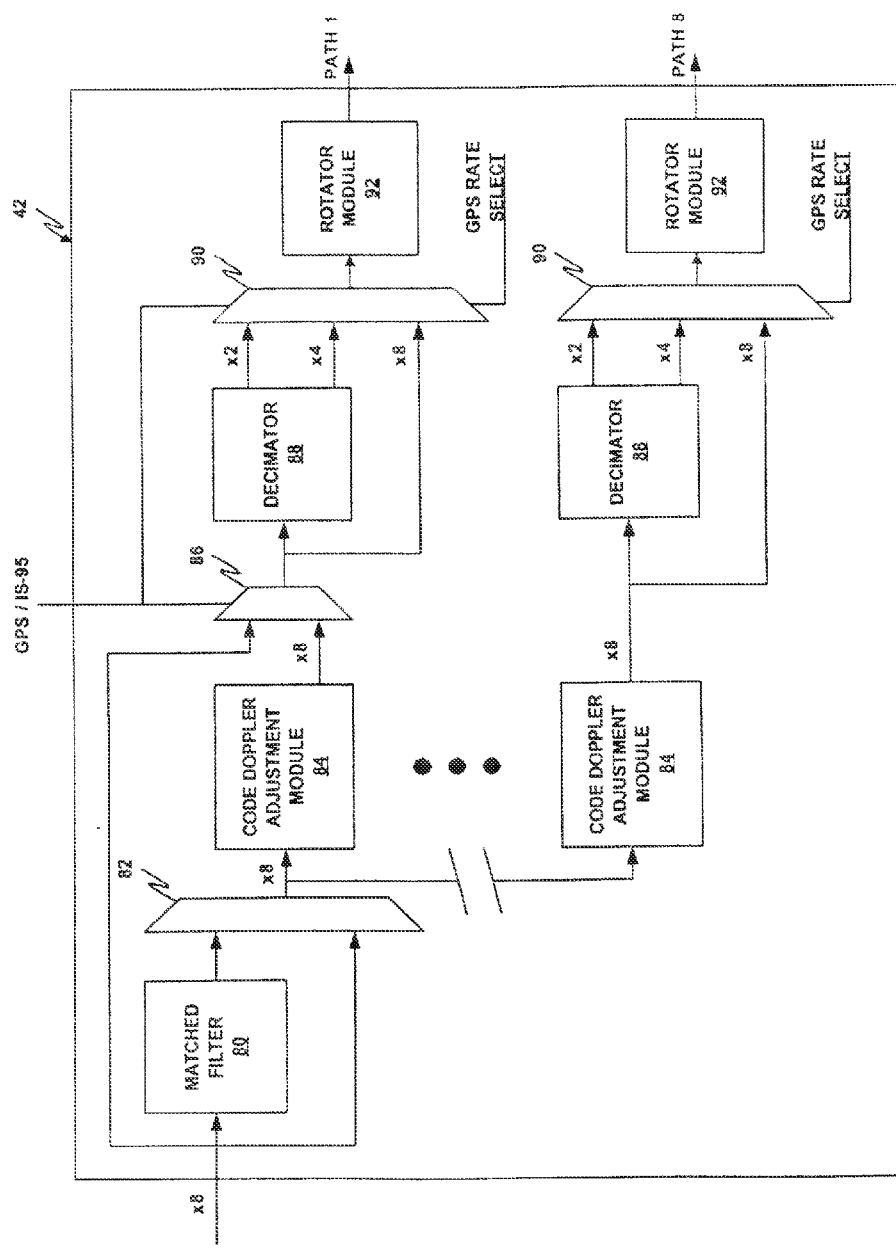
FIG. 3 is a block diagram illustrating an example front-end module for use in the channel search module.

After microprocessor 22 specifies the search parameters, channel search module 12 receives input (352), either from received I/Q data samples or from an optional front-end sample random access memory (RAM). The I/Q data samples are received at input 40 of FIG. 2 and can originate from a number of sources. These sources may include, for example, gain-adjusted I/Q data, center band I/Q data, lower band I/Q data, or higher band I/Q data from antenna 24 or another antenna. The I/Q data samples are then decimated and rotated by front-end module 42 to remove any large frequency offsets (354). FIG. 3 illustrates an example implementation of front-end module 42. Front-end module 42 can be configured to operate either in the IS-95 mode or in the GPS mode. In the GPS mode, a matched filter 80 performs matched filtering on the I/Q data samples. A multiplexer 82 provides the filtered I/Q data samples to code Doppler adjustment modules 84 in the GPS mode. Code Doppler adjustment modules 84, described in detail below in connection with FIG. 4, compensate for Doppler effects attributable to the high speed at which signal sources, i.e., the satellites, are moving relative to WCD 10. A multiplexer 86 provides the Doppler-compensated data to decimators 88, which perform C×8 to C×4 and C×8 to C×2 decimation and present the decimated data on C×4 and C×2 output lines, respectively. Multiplexers 90 select either the C×4 or C×2 decimated signal or the C×8 undecimated signal for each active channel, according to a decimation rate control signal, and present the selected signals to rotator modules 92, described in detail below in connection with FIG. 5. Rotator modules 92 perform front-end rotation on the selected signals to compensate for frequency errors and output the rotated data on outputs labeled PATH1-PATH8. FIG. 3 depicts only the outputs labeled PATH1 and PATH8.

In one embodiment, front-end module 42 includes eight code Doppler adjustment modules 84, eight decimators 88, eight multiplexers 90, and eight rotator modules 92. In this way, front-end module 42 supports up to eight channels, each of which can have its own decimation rate and rotator frequency. Out of space considerations, FIG. 3 depicts two sets of Doppler adjustment modules 84, decimators 88, multiplexers 90, and rotator modules 92.

Referring again to FIG. 3, when front-end module 42 operates in the IS-95 mode, only one channel is active. Multiplexers 82 and 86 pass the unfiltered I/Q data samples directly to a decimator 88, which performs C×8 to C×2 decimation on the data samples and outputs the decimated data to a rotator module 92. Rotator module 92 performs front-end rotation on the decimated data and outputs the rotated data on the output labeled PATH 1.

Figure 4:
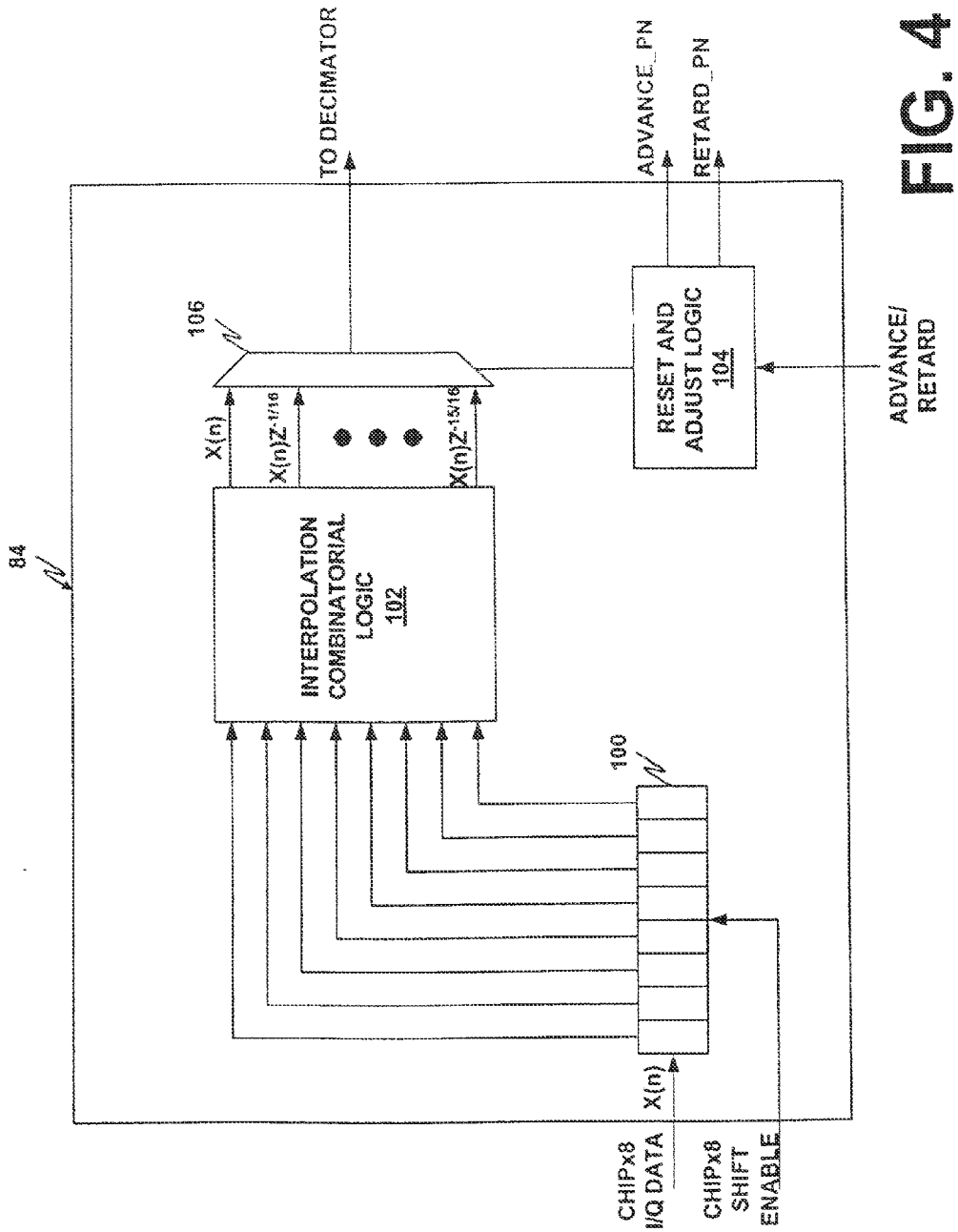
FIG. 4 is a block diagram illustrating an example code Doppler adjustment module for use in the front-end module.

FIG. 4 illustrates an example implementation of a code Doppler adjustment module 84. As described above, the I/Q data samples must be adjusted to compensate for code Doppler effects resulting from the high speed at which the signal sources, namely, the satellites, are moving relative to WCD 10. Code Doppler adjustment module 84 has an eight-tap shifter 100 and combinatorial logic 102 for generating interpolated samples to achieve C×16 resolution.

During initial setup, microprocessor 22 of FIG. 2 sets the initial tap-pointer position as a function of the Doppler condition, either advanced or retarded. Once the search has begun, microprocessor 22 can adjust for Doppler effects by sending an advance or retard command to move the pointer to shifter 100 half a tap either backward or forward, respectively. Moving the pointer has the effect of advancing or retarding the data by $\frac{1}{16}$ of a chip. Because of the finite size of shifter 100, a sequence of advance or retard commands may cause the pointer to move outside the bound of shifter 100, resulting in an "off-the-cliff" event. In this event, the pointer is moved from one end to the other end of shifter 100, resulting in an advance or retard of $\frac{15}{16}$ of a chip. If the off-the-cliff event was triggered by a retard command, the pointer is moved so as to cause a $\frac{15}{16}$ chip advance. Conversely, if an advance command triggered the off-the-cliff event, the pointer is moved so as to cause a $\frac{15}{16}$ chip retard. In either case, reset and adjust logic 104 generates an ADVANCE_PN command or a RETARD_PN command to advance or retard the PN sequence by one chip. For example, if the pointer is moved to cause a $\frac{15}{16}$ chip retard, reset and adjust logic 104 generates an ADVANCE_PN command to advance the PN sequence by one chip. As a result, the net effect is a $\frac{1}{16}$ chip advance or retard. The output of code Doppler adjustment module is provided to decimator 88 of FIG. 3 via a multiplexer 106.

Figure 5:
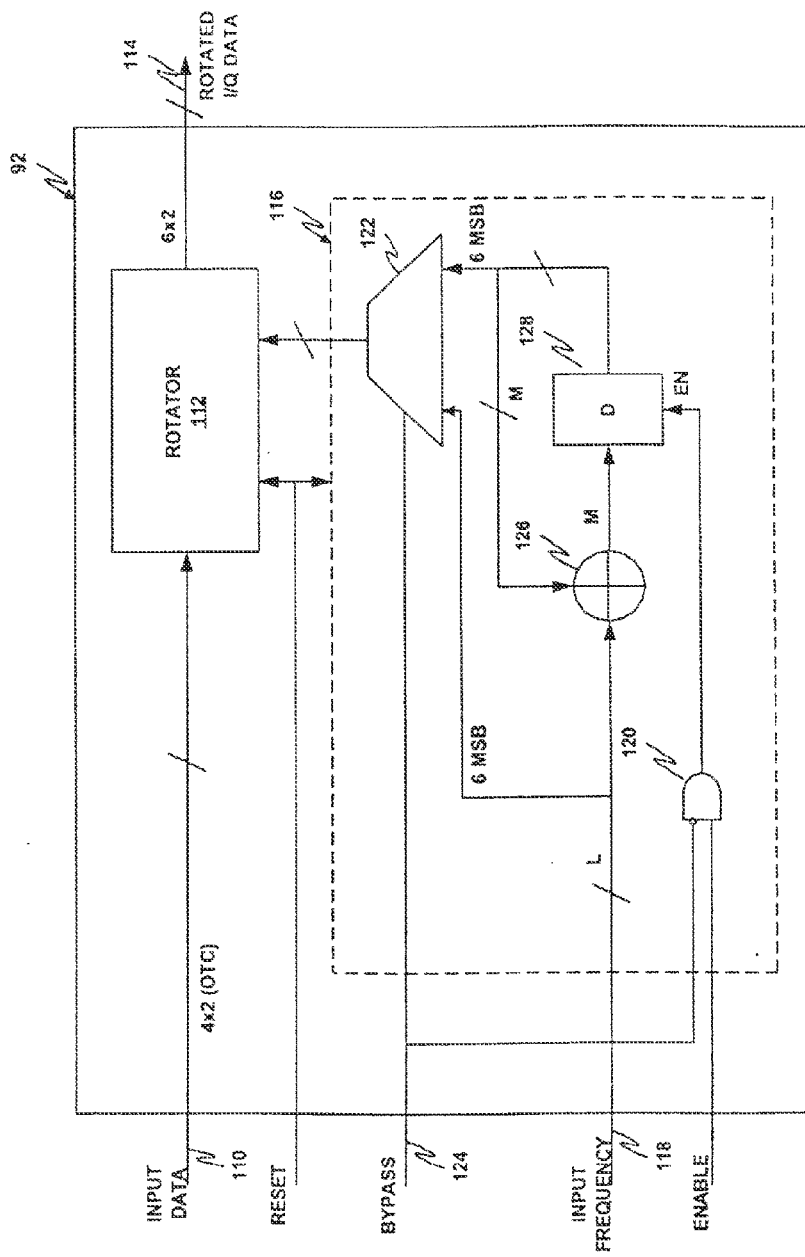
FIG. 5 is a block diagram illustrating an example front-end rotator module for use in the front-end module.

FIG. 5 depicts an example implementation of a rotator module 92. Rotator module 92 receives input samples at an input 110. The input samples can originate either from a front-end sample RAM (not shown) or from decimator 88. A rotator 112 may be applied to correct a large frequency offset before the input samples are provided to matched filter 44 of FIG. 2.

The input signal to rotator module 92 may be a 4-bit offset two's complement number for each dimension (I and Q), representing values from −7.5 to 7.5. Rotator module 92 generates a 6-bit two's complement number for each dimension on an output 114. The output represents a rotation phase represented as a 6-bit number, such that one least significant bit (LSB) corresponds to an angle of π/32 radians (4.1625°).

A phase integrator 116 controls the rotator phase. Microprocessor 22 provides the frequency offset via an input 118. A logic gate 120 and a multiplexer 122 allow microprocessor 22 to bypass phase integrator 116 via a control input 124, enabling microprocessor 22 to program the phase offset directly. When phase integrator 116 is not bypassed via control input 124, a summer 126 and a latch 128 accumulate and store frequency offsets received via input 118. The output of phase integrator 116 is provided to rotator 112.

In FIG. 5, M denotes the bitwidth of phase integrator 116 and L denotes the bitwidth of the frequency input. If $T_R$ represents the phase integrator update interval in seconds, the frequency $f_{LSB}$ represented by one LSB of the input to phase integrator 116 can be expressed as:

$$f_{LSB} = \frac{1}{2^M T_R}$$

and the maximum frequency offset $f_{MAX}$ in each of the positive and negative directions can be expressed as:

$$f_{MAX} = 2^{L-1} f_{LSB} = \frac{1}{2^{M-L+1} T_R}$$

M and L are selected so as to accommodate a variety of phase integrator update intervals. In this way, phase integrator 116 can support both fine resolution and high Doppler frequencies. In one embodiment, M and L are selected to support a maximum Doppler frequency of ±4500 Hz. For example, values of 21 and 16 may be selected for M and L, respectively. The following table lists $T_R$, $f_{LSB}$, and $f_{MAX}$ for various modes of operation.

| Operation Mode | $T_R$ | $f_{LSB}$ | $f_{MAX}$ |
|---|---|---|---|
| IS-95 Cx2 | 0.4069 μs | 1.172 Hz | 38.4 kHz |
| IS-95 Cx6 (3xDS) | 0.1356 μs | 0.390 Hz | 9.6 kHz |
| GPS Cx2 | 0.4888 μs | 0.9755 Hz | 31.9 kHz |
| GPS Cx8 | 0.1222 μs | 0.2439 Hz | 7.99 kHz |

Figure 6:
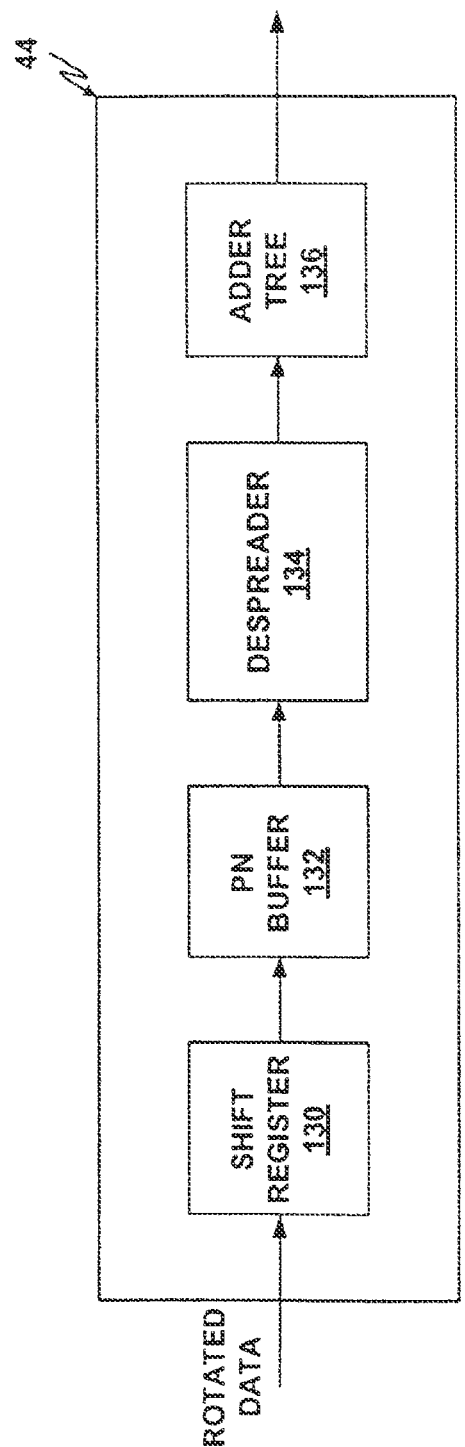
FIG. 6 is a block diagram illustrating an example matched filter module for use in the channel search module.

The outputs of rotator modules 92 are provided to a matched filter 44. Matched filter 44 despreads the data (356) by four independent PN offsets within a Cx2 period to yield four pairs (I-Q) of despread results. FIG. 6 depicts an example implementation of matched filter 44. A shift register 130 receives rotated I/Q data from front-end module 42 of FIG. 2. A PN buffer 132 and a despreader 134 perform PN despreading on the data from shift register 130. PN buffer 132 may be implemented as a 64-bit buffer. An adder tree 136 generates a 24-bit sum (12-bit 1 and 12-bit Q) each Cx8 cycle.

Matched filter 44 can operate in the IS-95 mode or the GPS mode. In the IS-95 mode, shift register 130 is implemented as a 128-stage, 64-tap shift register. Each stage is 12 bits wide to accommodate 6-bit I and 6-bit Q data from front-end module 42. The data is shifted into shift register 130 at Cx2 rate. Shift register 130 presents output on 64 taps, each Cx1 apart, i.e., one tap per chip time. The 64 data points are despread by 64 PN bits in PN buffer 132. Adder tree 136 generates a 24-bit sum (12-bit 1 and 12-bit Q) each Cx8 cycle.

Figure 7:
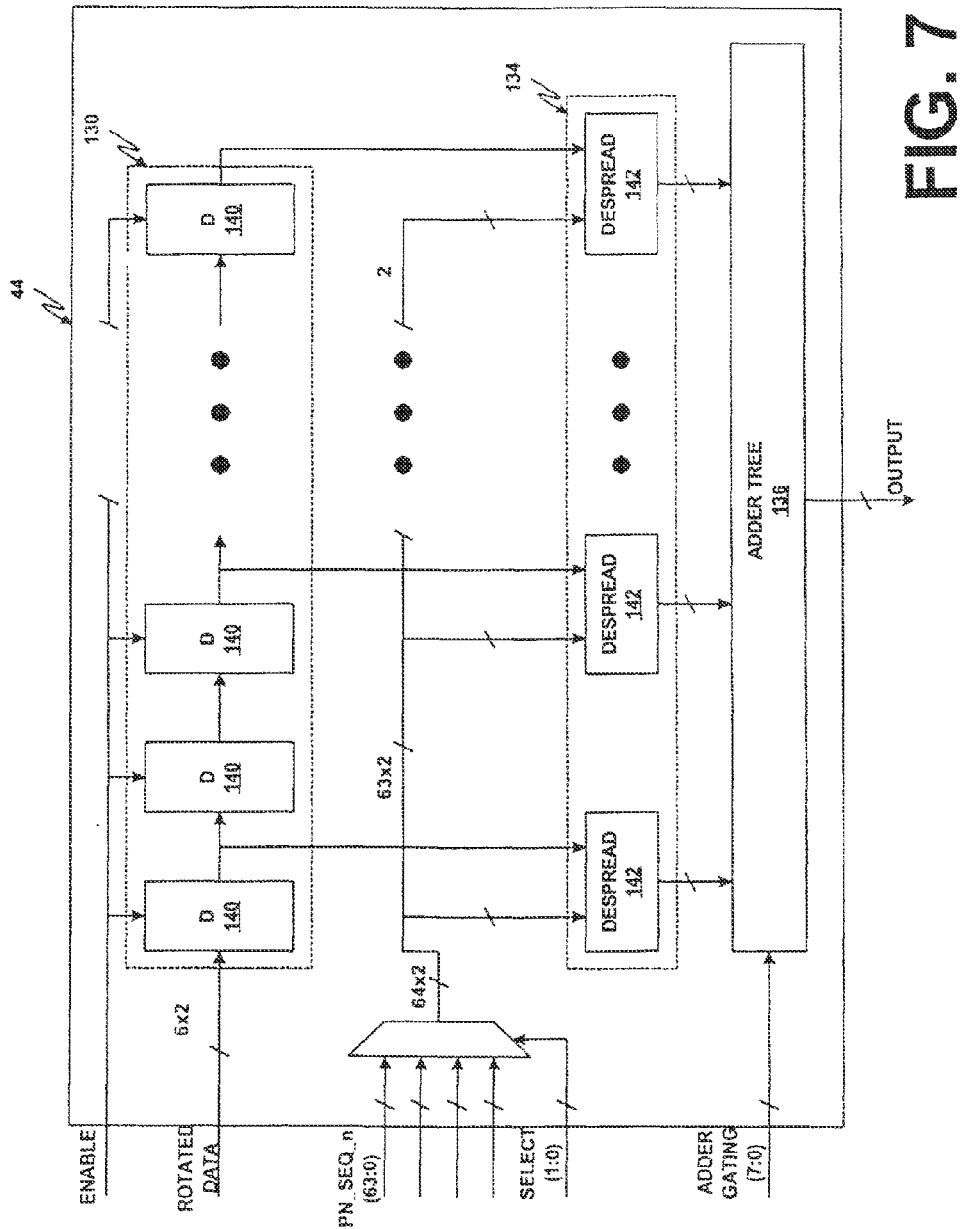
FIG. 7 is a block diagram illustrating an example implementation of the matched filter module in an IS-95 mode of operation.

FIG. 7 illustrates matched filter 44 operating in the IS-95 mode. The outputs of rotator modules 92 of FIG. 3 shift through shift register 130, implemented as D latches 140, at a Cx2 rate. Shift register 130 performs serial-to-parallel conversion. At any time, there are 128 half-chip parallel I/Q samples available at the output of shift register 130. Half of the parallel samples that align to the chip boundary are correlated by PN and Walsh codes by despreaders 142. Adder tree 136, implemented as a 64-to-1 adder tree, performs a 64-chip partial coherent accumulation and sums the correlated samples. This process is known as matched filtering.

Because the incoming samples from rotator modules 92 shift through shift register 130 at a Cx2 rate, the contents of shift register 130 remain unchanged during four Cx8 cycles. The hardware is capable of completing the correlation and partial coherent accumulation within one Cx8 cycle. Accordingly, the hardware can use the remaining three Cx8 cycles to perform three additional matched filtering as long as a new set of PN and Walsh codes is provided each cycle. In this way, channel search module 12 can implement four independent time-multiplexed searchers.

Shift register 130 allows a minimum 64-chip partial coherent accumulation period. As described below, the use of coherent RAM allows coherent accumulation of any multiple of 64 chips. In order to allow the coherent accumulation length to be set with a finer resolution, adder tree 136 includes a gating mechanism so that the addition is performed over a length shorter than 64 bits. The gating can be performed in increments of eight chips such that 8×N (N having a value between 0 and 7) despread chips from the left are gated off within adder tree 136. The gating mechanism can also be used to shut down matched filter 44 temporarily to conserve power when the search window size is not a multiple of 64 chips.

In the GPS mode, matched filter 44 is partitioned into eight channels. That is, shift register 130 is partitioned into eight 16-stage, 8-tap shift register banks. Each channel also has an 8-bit PN buffer. Each channel receives rotated data from a different path of front-end module 42. For each channel, the eight data points are despread by 8 PN bits in PN buffer 132. Adder tree 136 generates a 24-bit sum (12-bit I and 12-bit Q) each Cx8 cycle.

Figure 8:
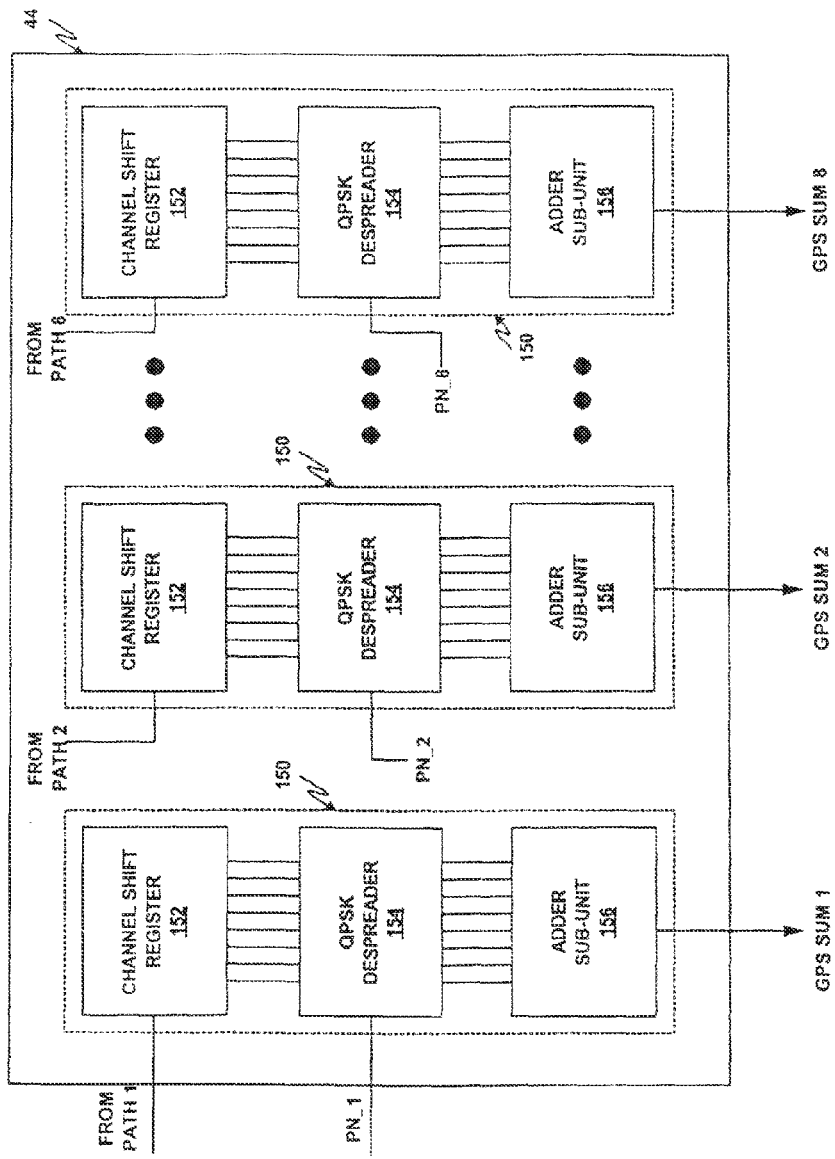
FIG. 8 is a block diagram illustrating an example implementation of the matched filter module in a GPS mode of operation.

FIG. 8 illustrates matched filter 44 operating in the GPS mode. The operation of matched filter 44 in the GPS mode is similar to the operation in the IS-95 mode. Unlike in the IS-95 mode, however, shift register 130 is divided into eight subunits or channels 150, each receiving different rotated data and PN codes, in the GPS mode. Each channel 150 can be selectively turned on or off individually to conserve power.

Each channel 150 includes a channel shift register 152, a QPSK despreader 154, and an adder sub-unit 156. Channel shift register 152 is a portion of shift register 130 that implements a 16-stage, 8-tap shift register and receives rotated data from an associated path of front-end module 42. Despreaders 154 perform QPSK despreading on the data from channel shift registers 152. Each despreader 154 can perform QPSK despreading with a different PN code. Adder tree 136 of FIG. 6 is divided into eight adder sub-units 156, each of which outputs one I/Q pair matched filter result per Cx8 cycle.

Figure 9:
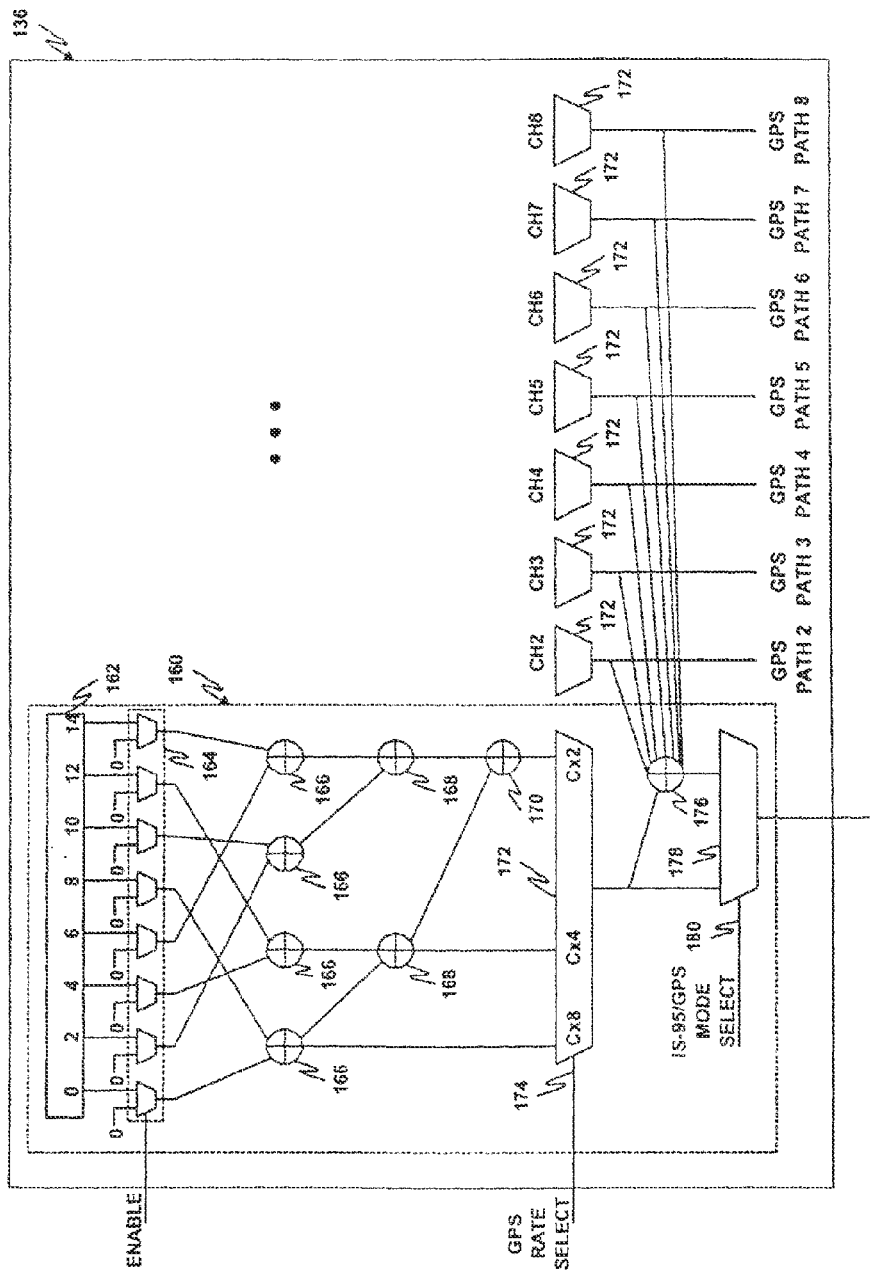
FIG. 9 is a block diagram illustrating an example adder module for use in the matched filter module.

FIG. 9 illustrates an example implementation of adder tree 136 of FIG. 6. Adder tree 136 is configured to support four modes of operation: IS-95, GPS C×2, GPS C×4, and GPS C×8 modes. Adder tree 136 is subdivided into eight channels 160, one of which is shown in detail in FIG. 9. Each channel 160 receives data from despreader 134 of FIG. 6 via a shift register 162. Multiplexers 164 pass the data from shift register 162 to adders 166 when enabled by an enable signal. When the enable signal is not active, multiplexers 164 pass zeroes to adders 166. One adder 166 generates the sum for the GPS C×8 mode. In addition, adders 166 provide sums to two adders 168, one of which generates the sum for the GPS C×4 mode. Adders 168 in turn provide sums to an adder 170, which generates the sum for the GPS C×2 mode. The sums for the GPS C×8, C×4, and C×2 modes are provided to a multiplexer 172, which outputs one of the sums based on a rate selection signal received at an input 174. The selected sum is output both to an adder 176 and to a multiplexer 178. Adder 176 sums the output of multiplexer 172 and similarly obtained outputs of multiplexers 172 in the other channels 160. Multiplexer 178 outputs either the output of multiplexer 172 or adder 176, depending on a mode selection signal received at an input 180.

Accordingly, via appropriate selection signals provided to multiplexers 172 and 178, adder tree 136 can support any of the IS-95, GPS C×2, GPS C×4, and GPS C×8 modes. For example, selecting the IS-95 mode via input 180 causes multiplexer 178 to output the sum of all of the channels 160 as obtained by adder 176. On the other hand, selecting the GPS mode via input 180 causes multiplexer 178 to output either the C×2, C×4, or C×8 signal from multiplexer 172, as specified by the rate selection signal received at input 174.

Figure 10:
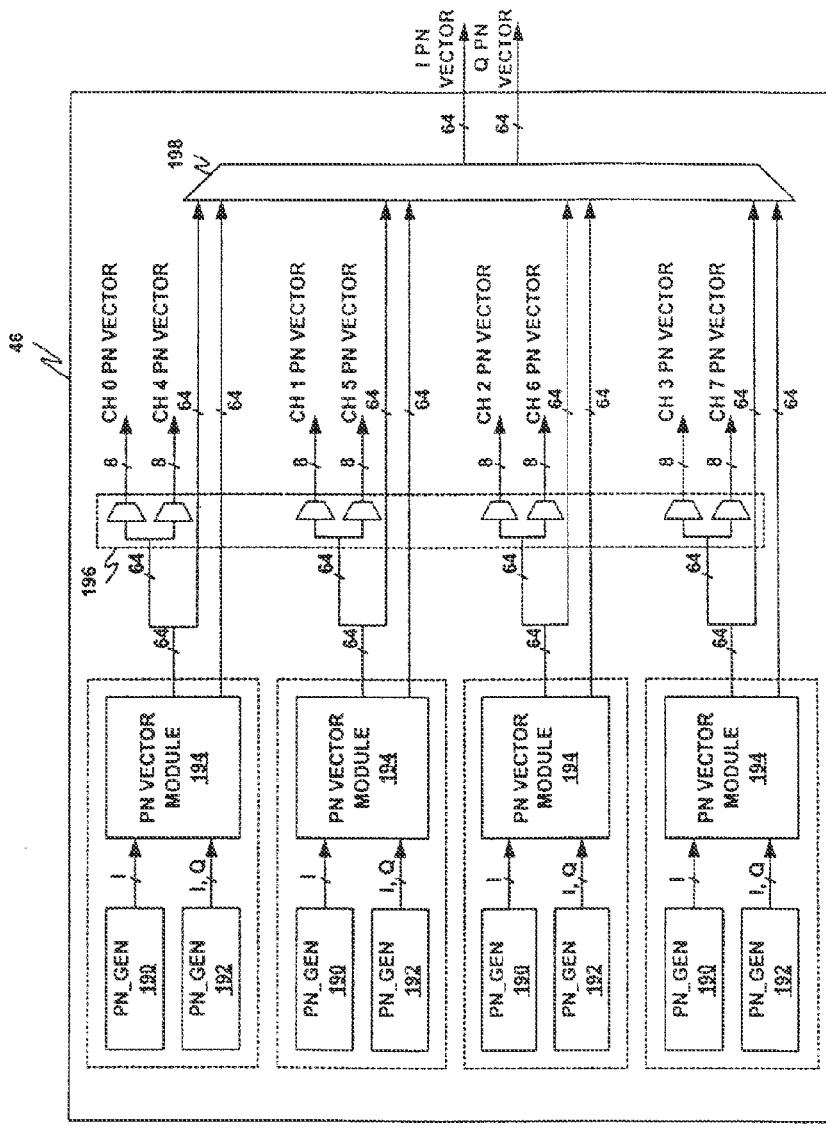
FIG. 10 is a block diagram illustrating an example PN generator for use in the channel search module.

The PN sequences used by despreader 134 of FIG. 6 are generated by PN generator module 46 of FIG. 2. FIG. 10 depicts an example implementation of PN generator module 46, which includes a number of PN generators 190 that can be configured to generate PN sequences (both I and Q sequences) in either the IS-95 mode or the GPS mode. PN generator module 46 also includes a number of PN generators 192 that generate PN sequences in the GPS mode only, i.e., only I sequences. PN generator module 46 is programmed by microprocessor 22. Once programmed, each PN generator 190 and each PN generator 192 slews to an assigned PN position. The slew amount may be calculated based in part on a reference count and represents the remaining number of chips by which a PN generator 190 or a PN generator 192 needs to be slewed to arrive at the target PN position. Once at the correct PN position, each PN generator 190 and each PN generator 192 generate PN bits at the steady rate of one bit per chip time, i.e., C×1 rate.

PN vector modules 194 generate 64-bit PN vectors based on the outputs of PN generators 190 and 192. Each PN vector module 194 is associated with one PN generator 190 and one PN generator 192. The 64-bit PN vectors are provided to multiplexers 196 and to a multiplexer 198. In the GPS mode, when 8 PN bits are accumulated in PN vector module 194 from a PN generator 192, the 8 PN bits are loaded in parallel into an output buffer of PN vector module 194 for use in PN despreading for the next 8 chip time. Multiplexers 196 each select an 8-bit portion of the 64-bit PN vectors for output as individual channel PN vectors.

In the IS-95 mode, on the other hand, when 64 PN bits are accumulated in PN vector module 194 from a PN generator 190 or a PN generator 192, the 64 PN bits are loaded in parallel into the output buffer of PN vector module 194 for use in PN despreading for the next 64 chip time. Multiplexer 198 selects one of the 64-bit PN vectors for output as a 64-bit I PN vector and another of the 64-bit PN vectors for output as a 64-bit Q PN vector in the IS-95 mode.

Figure 11:
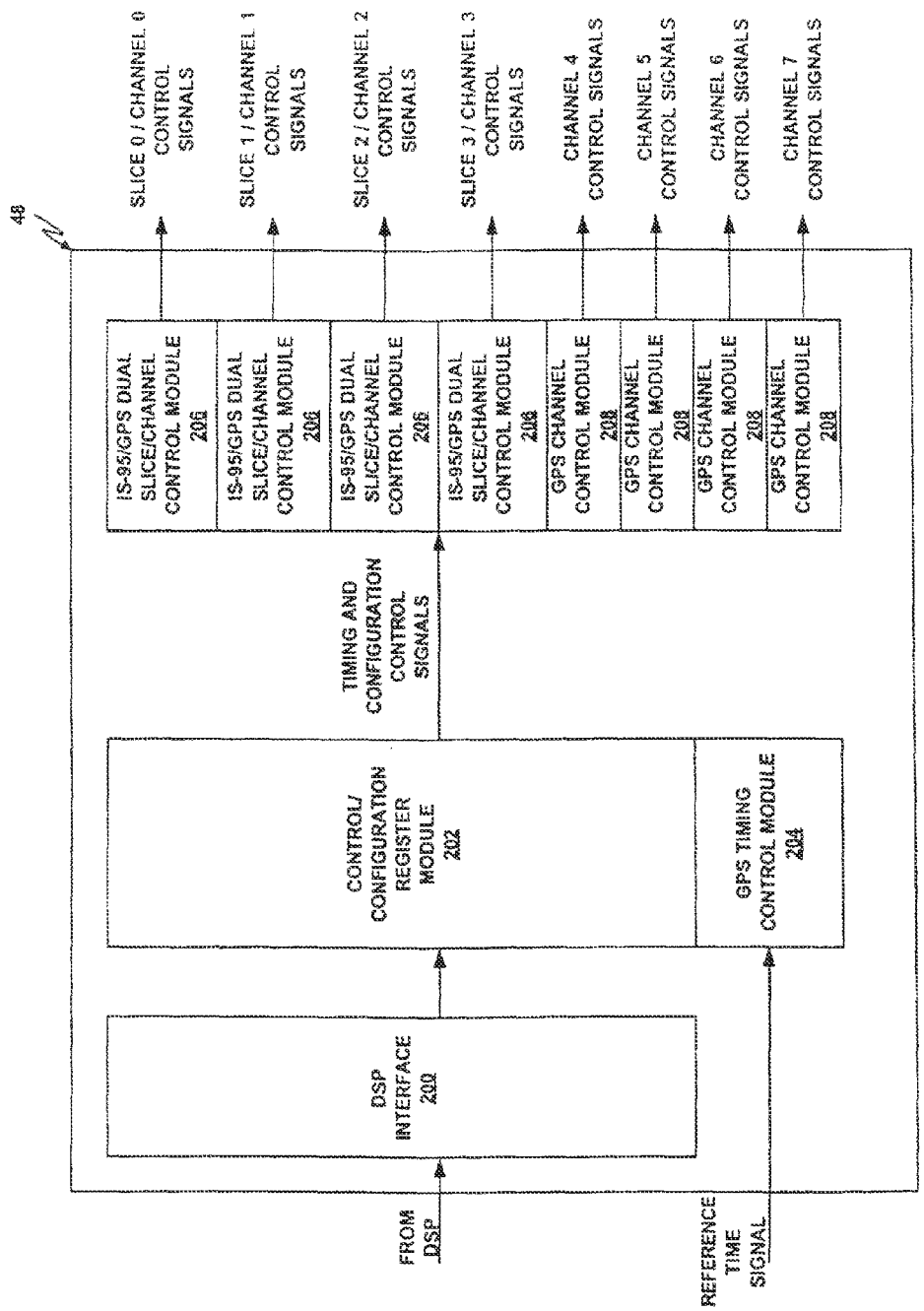
FIG. 11 is a block diagram illustrating an example configuration module for use in the channel search module.

PN generator module 46 generates PN sequences based in part on control signals received from timing/configuration control module 48. FIG. 11 depicts an example implementation of timing/configuration control module 48. A DSP interface 200 receives configuration and control information from microprocessor 22 and stores this information in a control/configuration register module 202. Based on this information and on a reference time signal received by a GPS timing control module 204, control/configuration register module 202 provides timing and configuration control signals to IS-95/GPS dual slice/channel control modules 206 and to GPS channel control modules 208. In the IS-95 mode, IS-95/GPS dual slice/channel control modules 206 generate control signals for each time-multiplexed slice of channel search module 12, and GPS channel control modules 208 are not used. In the GPS mode, on the other hand, IS-95 dual slice/control modules 206 and GPS channel control modules 208 generate control signals for each of the eight GPS channels of channel search module 12.

The control signals generated by IS-95 dual slice/channel control modules 206 and by GPS channel control modules 208 are used to configure various searcher components into appropriate operational modes according to a prescribed time sequence. This time sequence may be determined as a function of, for example, the coherent and non-coherent accumulation lengths and the window size. A number of example time sequences are described below in connection with FIGS. 19-21.

After despreading, the output of matched filter 44 of FIG. 6 is provided to a set of coherent accumulators (358), which include coherent RAM control module 50 and coherent RAM 52. I-Q sums are stored separately in coherent RAM 52. Coherent RAM control module 50 retrieves and accumulates partial coherent accumulation results using coherent RAM 52. In some embodiments, accumulation is performed using 16-bit saturation adders.

Figure 12:
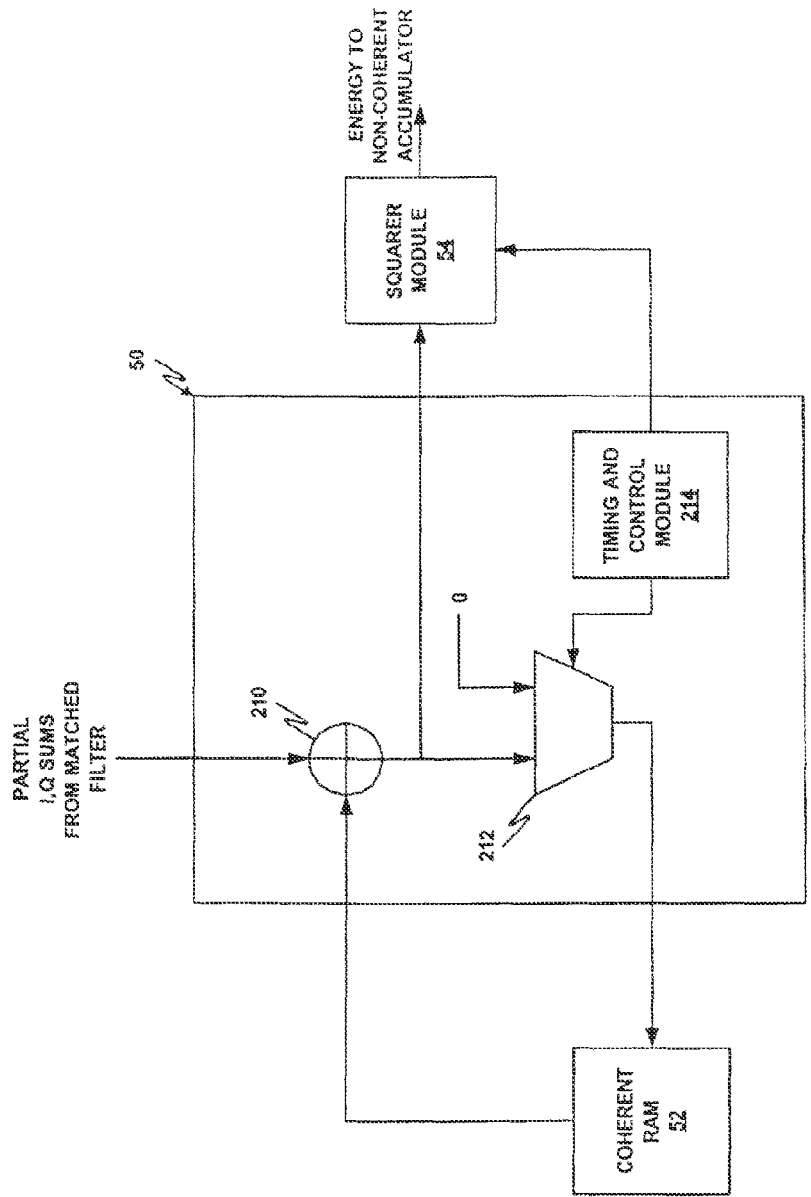
FIG. 12 is a block diagram illustrating an example configuration of a memory control module for use in the channel search module.

FIG. 12 is a block diagram illustrating the operation of coherent RAM control module 50 in the IS-95 mode. An accumulator 210 receives partial I and Q sums from matched filter 44 and adds these sums to data output by coherent RAM 52. The output of accumulator 210 is provided to coherent RAM 52 via a multiplexer 212. In this manner, accumulator 210 accumulates the I and Q sums. A timing and control module 214 enables squarer module 54 at the end of each coherent accumulation period, causing squarer module 54 to receive the coherent accumulation results from coherent RAM control module 50 for calculating energy values as the sum of the squares of the I and Q sums, i.e., $I^2+Q^2$. Squarer module 54 outputs the calculated energy values to non-coherent RAM control module 56 of FIG. 2. In addition to enabling squarer module 54 at the end of each coherent accumulation period, timing and control module 214 also clears coherent RAM 52 by passing zero values to coherent RAM 52 via multiplexer 212.

In the IS-95 mode, matched filter 44 may be limited to performing 64 chips of partial coherent accumulation. To facilitate coherent accumulation of more than 64 chips, coherent RAM 52 is configured to store the 64-chip partial sum for each of the 128 hypotheses, each separated in PN space by a half-chip. In particular, for every 64 chips, coherent RAM control module 50 determines whether the coherent accumulation window boundary has been reached. If so, coherent RAM control module 50 passes the accumulation result of the previous coherent accumulation window to squarer module 54 and then to non-coherent RAM control module 56 for non-coherent energy combining. If the boundary has not yet been reached, coherent RAM control module 50 reads the accumulation result of the previous coherent accumulation window out of coherent RAM 52, adds this result to the current rotator output from matched filter 44, and stores the sum in coherent RAM 52.

Coherent RAM 52 preferably has a high throughput to facilitate reading, adding, and writing data during every cycle. If coherent RAM 52 is implemented as a single port RAM and both read and write operations are performed during every cycle, two accumulation results are preferably double-packed into each 64-bit word to achieve the high throughput. Alternating read and write operations every cycle achieves, on average, a single-cycle read and write throughput rate.

The size of the coherent integration window is preferably selected such that the pilot phase remains relatively stable over the entire coherent integration window. Otherwise, coherently combining of the pilot energy may result in loss of signal strength. This situation may necessitate the use of a second stage of non-coherent energy combining.

Figure 13:
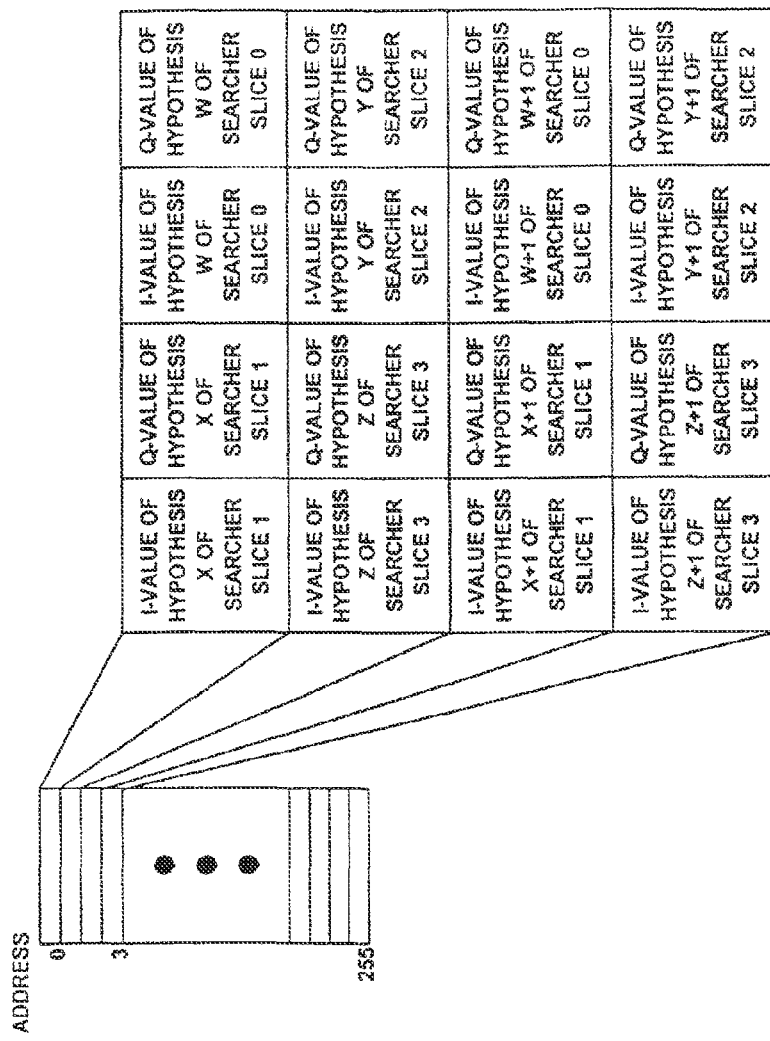
FIG. 13 is a block diagram illustrating an example memory configuration of a memory of the memory control module.

In the IS-95 mode, coherent RAM 52 maintains 128 hypotheses for each searcher. With double packing in each 64-bit RAM word, coherent RAM 52 is preferably configured to store 256 (64×4) 64-bit words. FIG. 13 illustrates an example 256×64 configuration of coherent RAM 52 in the IS-95 mode. As shown in FIG. 13, the first 64-bit word, corresponding to address 0, contains four 16-bit values representing the I- and Q-values of hypothesis X of searcher slice 1 and the I- and Q-values of hypothesis W of searcher slice 0. The second 64-bit word contains the I- and Q-values of hypothesis Z of searcher slice 3 and the I- and Q-values of hypothesis Y of searcher slice 2. The next two 64-bit words, corresponding to addresses 2 and 3, contain the I- and Q-values of subsequent hypotheses W+1, X+1, Y+1, and Z+1 for searcher slices 0-3.

Figure 14:
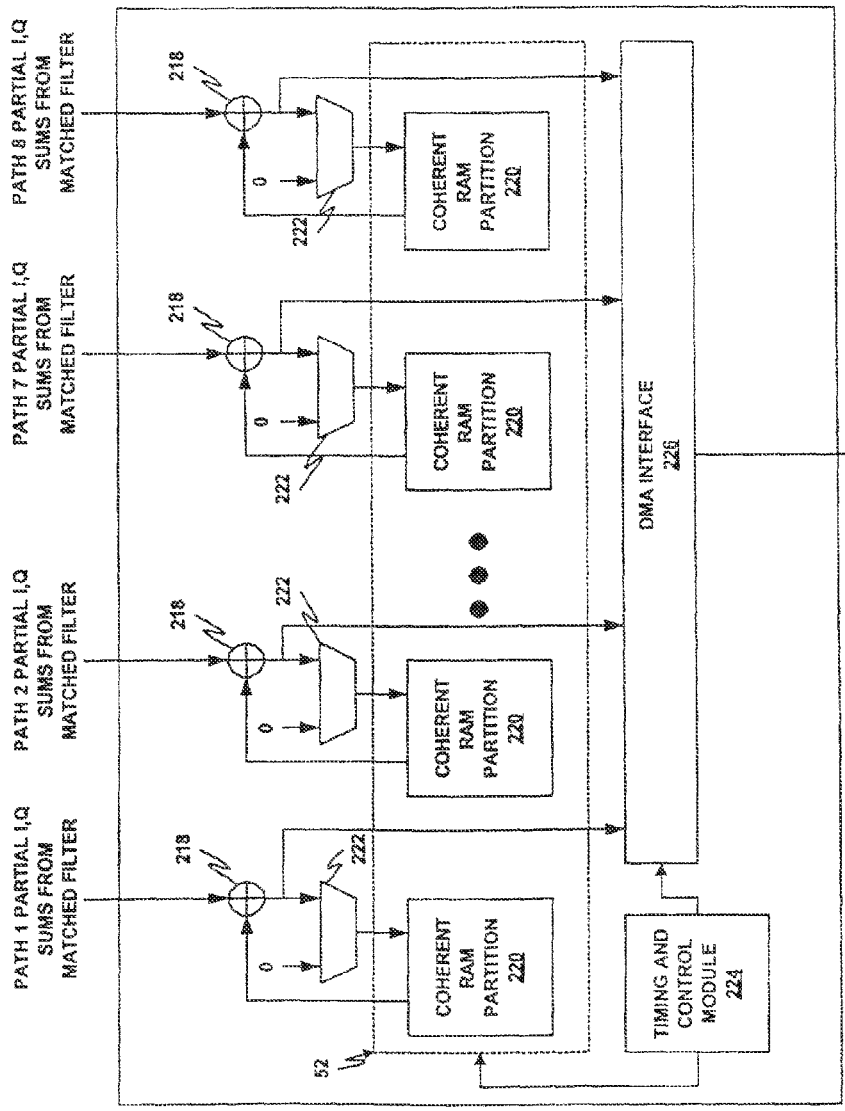
FIG. 14 is a block diagram illustrating another example configuration of a memory control module for use in the channel search module.

FIG. 14 is a block diagram illustrating the operation of coherent RAM control module 50 in the GPS mode. In the GPS mode, accumulators 218 receive partial I and Q sums from each of up to eight GPS channels. Accumulators 218 add these partial sums to data output by coherent RAM partitions 220, which are subdivisions of coherent RAM 52. Coherent RAM partitions 220 are configured as eight 32×64 RAM partitions, i.e., each storing 32 words of 64-bit length. The output of accumulators 218 is provided to coherent RAM partitions 220 via multiplexers 222. In this manner, accumulators 218 accumulate the I and Q sums for each of up to eight GPS channels. Each sum represents a different path from matched filter 44. A timing and control module 224 commands a DMA interface 226 to transfer the coherent sums to a processor memory at the end of each coherent accumulation period. In addition to controlling the transfer of coherent sums, timing and control module 224 also clears coherent RAM partitions 220 by passing zero values to coherent RAM partitions 220 via multiplexers 222.

It is to be noted that the implementations shown in FIGS. 12 and 14 represent alternate configurations of the same hardware. In particular, the configuration illustrated in FIG. 14 is achieved by dividing the hardware shown in FIG. 12 into eight partitions, one partition for each GPS channel. For example, as described above, coherent RAM 52 is configured as a 256×64 RAM in the IS-95 mode, but is configured as eight 32×64 RAM partitions in the GPS mode. Similarly, accumulators 218 of FIG. 14 are implemented by partitioning accumulator 212 of FIG. 12.

Referring again to FIG. 18, if channel search module 12 is operating in the GPS mode, the complex outputs of the coherent accumulators are sent to microprocessor 22 from coherent RAM 52 when coherent accumulation is complete (360). On the other hand, if channel search module 12 is operating in IS-95 mode, partial energy values are computed from the complex outputs of the coherent accumulators (362). As described above in connection with FIG. 12, squarer module 54 computes the partial energy values as $I^2+Q^2$.

The partial energy values are provided to a set of non-coherent accumulators (364), which include non-coherent RAM control module 56 and non-coherent RAM 58. Non-coherent RAM 58 stores a composite value derived from the I and Q values, rather than the individual I and Q values themselves. The outputs of the non-coherent accumulators make up a set of total energy values.

Figure 15:
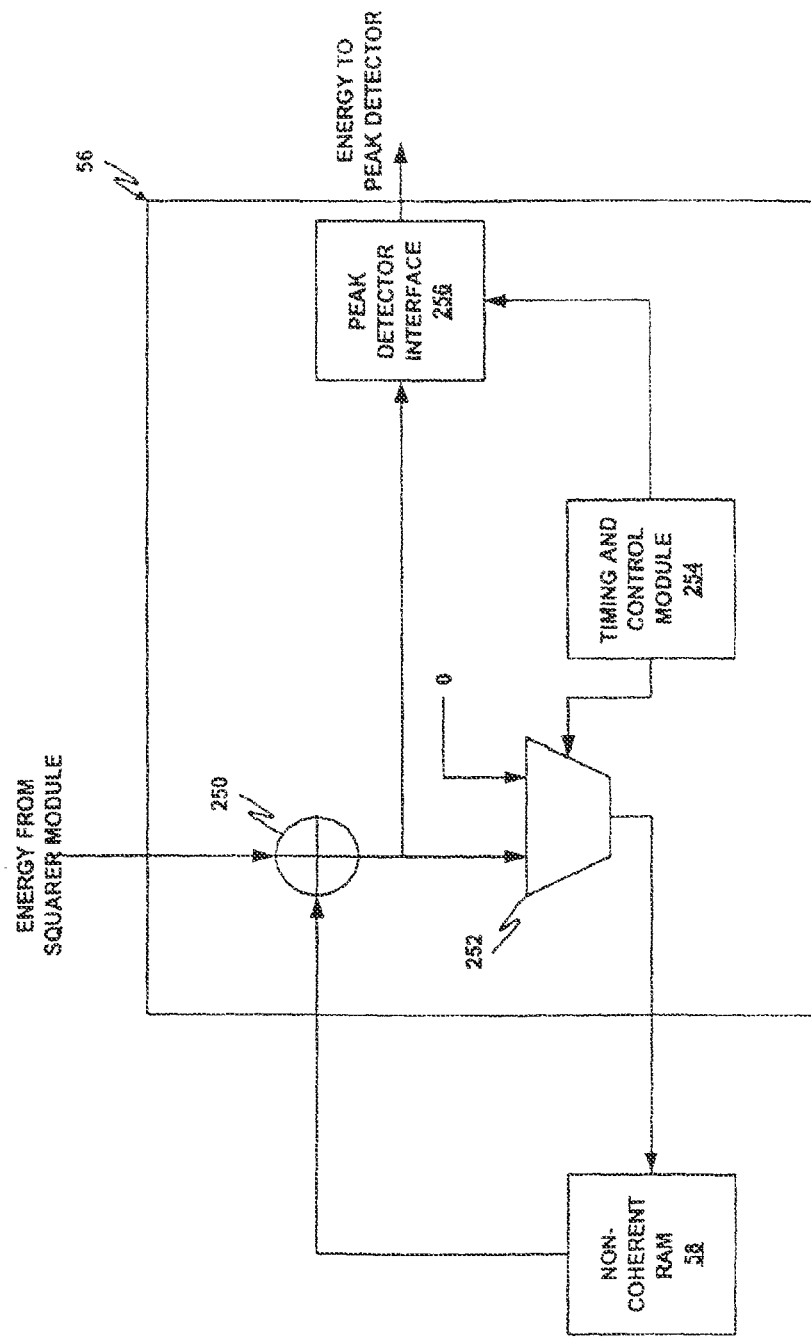
FIG. 15 is a block diagram illustrating an example memory control module for use in the channel search module.

FIG. 15 is a block diagram illustrating an example embodiment of non-coherent RAM control module 56. Non-coherent RAM control module 56 is only used in the IS-95 mode and is disabled in the GPS mode. In the IS-95 mode, whenever a search window completes a coherent accumulation, the coherent accumulation result is sent to non-coherent RAM control module 56 for non-coherent accumulation. An accumulator 250, preferably implemented as a 16-bit saturation adder, receives the computed energy values from squarer module 54 and adds these values to data output by non-coherent RAM 58, which is preferably configured as a 256× 32 RAM, i.e., to store 256 words of 32-bit length. The output of accumulator 250 is provided to non-coherent RAM 58 via a multiplexer 252. In this manner, accumulator 250 accumulates the I and Q sums.

A timing and control module 254 enables a peak detector interface 256 at the end of each non-coherent accumulation period, causing peak detector interface 256 to receive the non-coherent accumulation results from accumulator 250. Peak detector interface 256 then outputs the non-coherent accumulation results to peak detector 60 of FIG. 2. In addition to enabling peak detector interface 256 at the end of each non-coherent accumulation period, timing and control module 254 also clears non-coherent RAM 58 by passing zero values to non-coherent RAM 58 via multiplexer 252.

Non-coherent RAM control module 56 periodically determines whether a non-coherent accumulation window boundary has been reached. If so, non-coherent RAM control module 56 passes the accumulation result of the previous non-coherent accumulation window to peak detector interface 256 and then to peak detector 60 for energy peak detection. The coherent accumulation output from squarer module 54 is then loaded into non-coherent RAM 58 to start a new round of non-coherent accumulation. If the boundary has not yet been reached, non-coherent RAM control module 56 reads the accumulation result of the previous non-coherent accumulation window out of non-coherent RAM 58, adds this result to the current coherent window output from squarer module 54, and stores the sum in non-coherent RAM 58.

Non-coherent RAM 58 preferably has a high throughput to facilitate reading, adding, and writing data during every cycle. If non-coherent RAM 58 is implemented as a single port RAM and both read and write operations are performed during every cycle, two accumulation results are preferably double-packed into each word to achieve the high throughput. Alternating read and write operations every cycle achieves, on average, a single-cycle read and write throughput rate. Non-coherent RAM 58 and non-coherent RAM control module 56 may not need to be active during every cycle. For example, when coherent accumulation is still being performed for a set of hypotheses and no energy is coming from squarer module 54 to non-coherent RAM control module 56, non-coherent RAM 58 is not accessed and may be placed in an idle state to conserve power.

Peak detector 60 then processes the total energy value set and rejects false peaks within a half-chip of local peaks (366). Peak detector 60 can be configured to operate in any of a variety of modes via a control register. Each time-multiplexed slice of peak detector 60 may be configured to operate in a different mode. In a normal mode of operation, peak detector 60 suppresses energy values within a half-chip of local peaks. In addition, peak detector 60 also suppresses energy values below a prescribed energy threshold, such that only energy values above the threshold can qualify as peaks. Accordingly, in the normal mode, peak detector 60 identifies as peaks only those energy values that are (1) local maximums compared to all other energy values within a half-chip and (2) above the threshold. Peak detector 60 may also be configured to operate in a bypass mode in which peak filtering is disabled. In the bypass mode, peak detector 60 does not suppress energy values within a half-chip of local peaks. In another operational mode known as a disjoint mode, peak detector 60 may identify as peaks the two energy values at the two ends of the search window. Peak detector 60 may be configured to operate in the disjoint mode, for example, when search windows are disjoint from each other.

Figure 16:
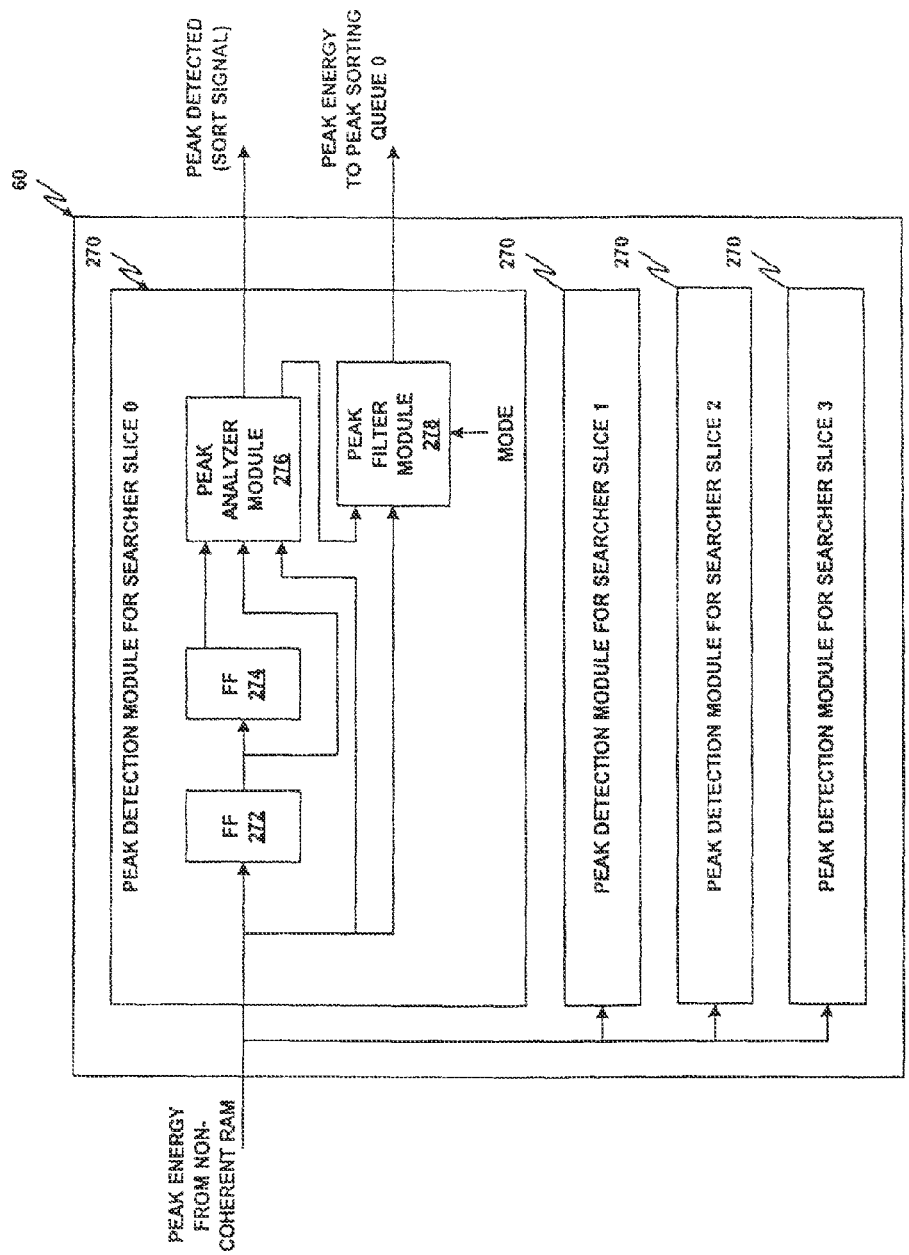
FIG. 16 is a block diagram illustrating an example peak detector module for use in the channel search module.

FIG. 16 illustrates an example implementation of peak detector 60. Peak detector is time-multiplexed into a number of peak detection modules 270 corresponding to the time-multiplexed searcher slices in the IS-95 mode. Four peak detection modules 270 are depicted in FIG. 16. For purposes of clarity, only one peak detection module 270 is illustrated in detail.

Peak detection module 270 receives peak energy values from non-coherent RAM control module 56 as a data stream. Flip-flops 272 and 274 store a history of peak energy values and provide this historical information to a peak analyzer module 276. In particular, peak analyzer module 276 receives three inputs. The energy value at the $n^{th}$ offset, E(n), is denoted as the on-time energy value and is provided by flip-flop 272. Flip-flop 274 provides an early energy value, i.e., the energy value E(n−1) at the $(n-1)^{th}$ offset, to peak analyzer module 276. Finally, peak analyzer module 276 receives a late energy value E(n+1), the energy value at the $(n+1)^{th}$ offset, directly from non-coherent RAM control module 56 without the delays imparted by flip-flops 272 and 274.

Based on the early, on-time, and late energy values, peak analyzer module 276 identifies energy peaks. Specifically, peak analyzer module 276 detects a peak at the $n^{th}$ offset if the following conditions are met:

$E(n-1) < E(n)$ $E(n) \geq E(n+1)$ $E(n) > T$ where T denotes the threshold energy value. When these conditions are met, peak analyzer module 276 outputs a peak detect signal to sorting module 62, indicating that a peak has been detected. A peak filter module 278 suppresses false peaks as described above according to a mode configured by a mode selection signal.

Peak detector 60 then provides the detected peaks to sorting module 62, which sorts the detected peaks and produces a set of maximum peaks (368). Sorting module 62 incorporates four independent sorting queues, one for each time-multiplexed searcher slice. FIG. 17 is a block diagram depicting an example embodiment of a sorting queue 290 for one searcher slice. When enabled by peak detector 60, sorting queue 290 receives energy values and corresponding PN offsets from peak detector 60 and sorts a number of maximum values for each search slice. An energy value and a corresponding PN offset are received by a comparator 292 and a register bank 294, respectively. In one embodiment, register bank 294 includes fifteen registers 296 and sorts fifteen maximum values for each search slice. Registers 296 are preferably implemented with a 64-chip length, but may be implemented with other lengths, e.g., 32 or 128 chips.

When sorting queue 290 receives a new energy value and corresponding PN offset, comparator 292 compares the new energy value with the sorted energies stored in register bank 294 using a binary sort algorithm. If the new energy value is larger than the smallest energy value stored in register bank 294, comparator 292 inserts the new energy value and corresponding PN offset into the appropriate register 296. Smaller energy values already stored in register bank 294 are shifted down to the next register 296, and the smallest energy value is shifted off register bank 294. In this manner, register bank 294 maintains a set of sorted energy values and corresponding PN offsets.

When the searcher completes the entire search window, sorting queue 290 issues an interrupt to microprocessor 22. Microprocessor 22 then reads the set of maximum peaks and corresponding PN offsets (370) from register bank 294 via a read interface 298.

As described above in connection with FIGS. 2-17 and in accordance with the flow diagram of FIG. 18, coherent accumulation, computation of partial energy values, non-coherent accumulation, and peak detection and sorting are performed for each of the independent searchers. Timing relationships between these processes are governed by timing and configuration control module 48 of FIG. 11. These timing relationships may be determined as a function of, for example, the coherent and non-coherent accumulation lengths and the window size. FIGS. 19-21 depict example timing relationships between coherent accumulation timing, non-coherent accumulator timing, and peak detection timing for channel search module 12 operating in the IS-95 mode in a number of scenarios.

In FIG. 19, the coherent accumulation length is set at 256 chips, the non-coherent accumulation length is set at 512 chips, and the window size is set at 128 chips. PN generator 46 begins in an idle state (400), but after 128 chips begins to slew to an assigned PN position (402). Once at the correct PN position, PN generator 46 generates PN bits (404) at the rate of one bit per chip time. After generating 64 bits, i.e., 64 chips later, matched filter 44 and coherent RAM control module 50 become active (406). Coherent RAM control module 50 performs coherent accumulation for the coherent accumulation length of 256 chips, adding and storing for the first 192 chips and adding and outputting for the last 64 chips (408). During these last 64 chips, non-coherent RAM control module 56 performs non-coherent accumulation. With the non-coherent accumulation length set at twice the coherent accumulation length, non-coherent RAM control module 56 stores non-coherent accumulation results during the first non-coherent accumulation operation, then outputs non-coherent accumulation results during the second non-coherent accumulation operation (410). When non-coherent RAM control module outputs the non-coherent accumulation results, peak detector 60 and sorting module 62 become active and sort the energy peak values output by non-coherent RAM control module 62.

In FIG. 20, the coherent accumulation length is set at 224 chips, the non-coherent accumulation length is set at 448 (2×224) chips, and the window size is set at 128 chips. In this scenario, the non-coherent accumulation length is twice the coherent accumulation length, and the timing relationship between coherent RAM control module 50 and non-coherent RAM control module 56 is similar to the relationship illustrated in FIG. 19. In the scenario illustrated in FIG. 19, however, the coherent accumulation length is twice the window size. By contrast, in the scenario illustrated in FIG. 20, the coherent accumulation length is not an integral multiple of the window size. Accordingly, matched filter 44 enters a gated state when non-coherent accumulation is performed (412).

In FIG. 21, the coherent accumulation length is set at 256 chips, the non-coherent accumulation length is set at 512 chips, and the window size is set at 96 chips. In this scenario, the non-coherent accumulation length is twice the coherent accumulation length, and the timing relationship between coherent RAM control module 50 and non-coherent RAM control module 56 is similar to the relationships illustrated in FIGS. 19 and 20. Unlike the scenarios illustrated in FIGS. 19 and 20, however, the window length is not an integral multiple of the shift register length of 64 chips. As a result, after the first peak detection operation (420), the gating mechanism of adder tree 136 periodically places matched filter 44 in an idle state to conserve power. Coherent RAM control module 50 also alternates between active (add and store) and idle states every 96 chips, outputting coherent accumulation results to non-coherent RAM control module 56 after every three add and store operations.

Instructions for causing a processor provided in WCD 10, such as a processor within channel search module 12, may be stored on processor readable media. By way of example, and not limitation, processor readable media may comprise storage media and/or communication media. Storage media includes volatile and nonvolatile, removable and fixed media implemented in any method or technology for storage of information such as processor-readable instructions, data structures, program modules, or other data. Storage media may include, but is not limited to, random access memory (RAM), read-only memory (ROM), EEPROM, flash memory, fixed or removable disc media, including optical or magnetic media, or any other medium that can be used to store the desired information and that can be accessed by a processor within WCD 10.

Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

By multiplexing searcher hardware to perform simultaneous searches in either an IS-95 mode or a GPS mode, various embodiments of the invention facilitate high-speed signal searching. The searcher hardware can be configured dynamically to operate in either the IS-95 mode or the GPS mode. In the IS-95 mode, the searcher is time-multiplexed into a number of searcher time slices that perform independent searches. In the GPS mode, the searcher is configured as a number of distinct GPS channels, each of tracks a GPS signal from a particular GPS satellite. This configuration allows the searcher to perform multiple GPS signal searches simultaneously. With the searcher hardware multiplexed to perform simultaneous independent searches, the speed of signal searching in both IS-95 and GPS modes may be significantly improved. For example, in the IS-95 mode, searches may be performed at a rate of 256×, i.e., correlating up to 512 hypotheses in one unit time. By comparison, some conventional searchers perform searches at a rate of 8×. Search speed may also be significantly increased in the GPS mode. Moreover, because the search hardware can be dynamically configured to operate in either the IS-95 or the GPS mode, the need for dedicated circuitry for each mode of operation may be obviated.

While various embodiments of the invention have been described, modifications may be made without departing from the spirit and scope of the invention. These and other embodiments are within the scope of the following claims.

What is claimed is:

1. A method for multiplexing CDMA and GPS searching, the method comprising:
   selecting a search mode from a plurality of search modes for a plurality of communication protocols, the plurality of search modes being associated with different search processing for the plurality of communication protocols;
   dynamically configuring channel search hardware to execute a plurality of independent searches including at least a first and second search modes utilizing respective first and second communication protocols, the channel search hardware comprises first hardware components allocated to both the first and second search modes, and second hardware components allocated to the second search mode, the first hardware components distinct from the second hardware components, the first search mode being a GPS mode and the second search mode being a CDMA mode, and in the first search mode the first hardware components are allocated to simultaneously perform the plurality of independent searches in parallel while the second hardware components are disabled, and in the second search mode the first hardware components and the second hardware components perform the independent searches in a time-multiplexed manner;
   simultaneously executing the plurality of independent searches using the configured channel search hardware; and
   configuring a demodulator of a wireless communication device as a function of results from the independent searches.

2. The method of claim 1, wherein each independent search is associated with a distinct set of search parameters.

3. The method of claim 2, wherein the search parameters comprise at least one of a window size, a coherent accumulation length, a non-coherent accumulation length, and a PN offset.

4. The method of claim 1, wherein configuring the demodulator as a function of the results from the independent searches comprises:
   despreading received data;
   generating a coherent accumulation result as a function of the despread data; and
   configuring the demodulator as a function of the coherent accumulation result if the selected search mode is the first search mode.

5. The method of claim 1, wherein configuring the demodulator as a function of the results from the independent searches if the second search mode is selected comprises:
   despreading received data;
   generating coherent accumulation results as a function of the despread data;

computing energy values as a function of the coherent accumulation results;
generating non-coherent accumulation results as a function of the energy values;
identifying a plurality of energy peaks as a function of the non-coherent accumulation results;
sorting the plurality of energy peaks; and
configuring the demodulator as a function of the sorted energy peaks.

6. A method for multiplexing CDMA and GPS searching, the method comprising:
dynamically configuring channel search hardware to perform a plurality of simultaneously executed independent searches in one of a plurality of search modes for a plurality of communication protocols, the plurality of search modes comprising a GPS mode and CDMA mode utilizing respective first and second protocols, the channel search hardware comprises first hardware components allocated to both the GPS search mode and the CDMA search mode, and second hardware components allocated to the CDMA search mode, the first hardware components distinct from the second hardware components, wherein in the GPS mode the first hardware components are allocated to simultaneously perform the independent searches in parallel where the second hardware components are disabled, and in the CDMA mode the first hardware components and second hardware components perform the searches in a time-multiplexed manner;
for each independent search, despreading received data;
generating coherent accumulation results as a function of the despread data;
in the GPS mode, configuring a demodulator as a function of the coherent accumulation results; and
in the CDMA mode,
computing energy values as a function of the coherent accumulation results,
generating non-coherent accumulation results as a function of the energy values,
identifying a plurality of energy peaks as a function of the non-coherent accumulation results,
sorting the plurality of energy peaks, and
configuring the demodulator as a function of the sorted energy peaks.

7. The method of claim 6, wherein the received data comprises I and Q quadrature components of at least one of gain-adjusted I/Q data, center band I/Q data, lower band I/Q data, and higher band I/Q data.

8. A computer readable medium including computer executable instructions stored thereon for:
selecting a search mode from a plurality of search modes for a plurality of communication protocols, the plurality of search modes being associated with different search processing for the plurality of communication protocols;
dynamically configuring channel search hardware to execute a plurality of independent searches including at least a first and second search modes utilizing respective first and second communication protocols, the channel search hardware comprises first hardware components allocated to both the first and second search modes, and second hardware components allocated to the second search mode, the first hardware components distinct from the second hardware components, the first search mode being a GPS mode and the second search mode being a CDMA mode, and in the first search mode the first hardware components are allocated to simultaneously perform the plurality of independent searches in parallel where the second hardware components are disabled, and in the second search mode the first hardware components and the second hardware components perform the independent searches in a time-multiplexed manner;
simultaneously executing the plurality of independent searches using the configured channel search hardware; and
configuring a demodulator of a wireless communication device as a function of results from the independent searches,
wherein the computer readable medium is one of the following: RAM, ROM, EEPROM, flash memory, fixed or removable disc media, including optical or magnetic media.

9. The computer readable medium of claim 8, wherein each independent search is associated with a distinct set of search parameters.

10. The computer readable medium of claim 9, wherein the search parameters comprise at least one of a window size, a coherent accumulation length, a non-coherent accumulation length, and a PN offset.

11. The computer readable medium of claim 8, including further instructions for:
despreading received data;
generating a coherent accumulation result as a function of the despread data; and
configuring the demodulator as a function of the coherent accumulation result if the selected search mode is the first search mode.

12. The computer readable medium of claim 8, including further instructions for configuring the demodulator as a function of the results from the independent searches if the second search mode is selected including:
despreading received data;
generating coherent accumulation results as a function of the despread data;
computing energy values as a function of the coherent accumulation results;
generating non-coherent accumulation results as a function of the energy values;
identifying a plurality of energy peaks as a function of the non-coherent accumulation results;
sorting the plurality of energy peaks; and
configuring the demodulator as a function of the sorted energy peaks.

13. A computer readable medium including computer executable instructions stored thereon for:
dynamically configuring channel search hardware to perform a plurality of simultaneously executed independent searches in one of a plurality of search modes for a plurality of communication protocols, the plurality of search modes comprising a GPS mode and a CDMA mode utilizing respective first and second protocols, the channel search hardware comprises first hardware components allocated to both the GPS search mode and the CDMA search mode, and second hardware components allocated to the CDMA search mode, the first hardware components distinct from the second hardware components, wherein in the GPS mode the first hardware components are allocated to simultaneously perform the independent searches in parallel where the second hardware components are disabled and in the CDMA mode the first hardware components and second hardware components perform the searches in a time-multiplexed manner;

for each independent search, using a matched filter to despread received data;
generating coherent accumulation results as a function of the despread data;
in the GPS mode, configuring a demodulator as a function of the coherent accumulation results; and
in the CDMA mode,
computing energy values as a function of the coherent accumulation results,
generating non-coherent accumulation results as a function of the energy values,
identifying a plurality of energy peaks as a function of the non-coherent accumulation results,
sorting the plurality of energy peaks, and
configuring the demodulator as a function of the sorted energy peaks,
wherein the computer readable medium is one of the following: RAM, ROM, EEPROM, flash memory, fixed or removable disc media, including optical or magnetic media.

14. An apparatus for multiplexing CDMA and GPS searching, the apparatus comprising:
a channel search module configured to perform a plurality of simultaneously executed independent searches in one of a plurality of search modes for a plurality of communication protocols, the plurality of search modes comprising a GPS mode and a CDMA mode utilizing respective first and second communication protocols, the channel search module comprises first hardware components allocated to both the GPS mode and the CDMA mode, and second hardware components allocated to the CDMA mode, the first hardware components distinct from the second hardware components;
a control module to dynamically configure the channel search module as a plurality of simultaneously operating GPS channels in the GPS mode using the first hardware components while the second hardware components are disabled, and to dynamically reconfigure the channel search module as a plurality of time-multiplexed searcher time slices in the CDMA mode using the first hardware components and the second hardware components; and
a modem to demodulate a signal based on results from the searches, wherein the channel search module comprises a coherent accumulator arrangement configured to generate a coherent accumulation result in the CDMA mode and to generate a set of coherent accumulation results in the GPS mode.

15. The apparatus of claim 14, wherein the channel search module comprises a matched filter to despread received data, the matched filter comprising an adder arrangement configured to output a first sum in the GPS mode and a second sum in the CDMA mode.

16. The apparatus of claim 14, wherein the channel search module comprises a PN generator to generate a PN sequence in the CDMA mode and a set of PN sequences in the GPS mode.

17. The apparatus of claim 14, wherein the channel search module configures the modem as a function of the set of coherent accumulation results in the GPS mode.

18. An apparatus for multiplexing CDMA and GPS searching, the apparatus comprising:
means for selecting a search mode from a plurality of search modes for a plurality of communication protocols, the plurality of search modes being associated with different search processing for the plurality of communication protocols;
means for dynamically configuring channel search hardware to execute a plurality of independent searches including at least a first and second search modes utilizing respective first and second communication protocols, the channel search hardware comprises first hardware components allocated to both the first and second search modes, and second hardware components allocated to the second search mode, the first hardware components distinct from the second hardware components, the first search mode being a GPS mode and the second search mode being a CDMA mode, and in the first search mode the first hardware components are allocated to simultaneously perform the plurality of independent searches in parallel while the second hardware components are disabled, and in the second search mode the first hardware components and the second hardware components perform the independent searches in a time-multiplexed manner;
means for simultaneously executing the plurality of independent searches using the configured channel search hardware; and
means for configuring a demodulator of a wireless communication device as a function of results from the independent searches.

19. The apparatus of claim 18, wherein each independent search is associated with a distinct set of search parameters.

20. The apparatus of claim 19, wherein the search parameters comprise at least one of a window size, a coherent accumulation length, a non-coherent accumulation length, and a PN offset.

21. The apparatus of claim 18, wherein the means for configuring the demodulator as a function of the results from the independent searches comprises:
means for despreading received data;
means for generating a coherent accumulation result as a function of the despread data; and
means for configuring the demodulator as a function of the coherent accumulation result if the selected search mode is the first search mode.

22. The apparatus of claim 18, further comprising:
means for despreading received data;
means for generating coherent accumulation results as a function of the despread data;
means for computing energy values as a function of the coherent accumulation results;
means for generating non-coherent accumulation results as a function of the energy values;
means for identifying a plurality of energy peaks as a function of the non-coherent accumulation results; and
means for sorting the plurality of energy peaks;
wherein the demodulator is configured as a function of the sorted energy peaks if the selected search mode is the second search mode.

23. An apparatus for multiplexing CDMA and GPS searching, the apparatus comprising:
means for dynamically configuring channel search hardware to perform a plurality of simultaneously executed independent searches in one of a plurality of search modes for a plurality of communication protocols, the plurality of search modes comprising a GPS mode and a CDMA mode utilizing respective first and second protocols, the channel search hardware comprises first hardware components allocated to both the GPS search mode and the CDMA search mode, and second hardware components allocated to the CDMA search mode, the first hardware components distinct from the second hardware components, wherein in the GPS mode the first hardware components are allocated to simultaneously perform the independent searches in parallel where the second hardware components are disabled, and in the CDMA mode the first hardware components and second hardware components perform the searches in a time-multiplexed manner;

means for despreading received data for each independent search;

means for generating coherent accumulation results as a function of the despread data;

means for configuring a demodulator as a function of the coherent accumulation results in the GPS mode; and means for, in the CDMA mode,
- computing energy values as a function of the coherent accumulation results,
- generating non-coherent accumulation results as a function of the energy values,
- identifying a plurality of energy peaks as a function of the non-coherent accumulation results,
- sorting the plurality of energy peaks, and
- configuring the demodulator as a function of the sorted energy peaks.

24. The apparatus of claim 23, wherein the received data comprises I and Q quadrature components of at least one of gain-adjusted I/Q data, center band I/Q data, lower band I/Q data, and higher band I/Q data.

* * * * *